(12) United States Patent  
Ibamoto et al.

(10) Patent No.: US 7,083,545 B2  
(45) Date of Patent: Aug. 1, 2006

(54) AUTOMATIC TRANSMISSION SYSTEM AND AUTOMOBILE USING THE SYSTEM

(75) Inventors: Masahiko Ibamoto, Hitachinaka (JP); Hiroyuki Sakamoto, Hitachinaka (JP); Hiroshi Kuroiwa, Hitachi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/728,754

(22) Filed: Dec. 8, 2003

(65) Prior Publication Data

US 2004/0116243 A1 Jun. 17, 2004

(30) Foreign Application Priority Data

Dec. 9, 2002 (JP) .............................. 2002-356124

(51) Int. Cl.
B60W 10/02 (2006.01)

(52) U.S. Cl. .......................... 477/5; 74/331; 74/336 R; 74/339; 74/661; 74/664; 180/65.2; 180/65.4; 180/65.6; 180/65.7

(58) Field of Classification Search ................ 74/331, 74/336 R, 339, 661, 664; 180/65.2, 65.4, 180/65.6, 65.7, 65.8; 477/5, 30; 475/5
See application file for complete search history.

(56) References Cited

U.S. PATENT DOCUMENTS

| | | | |
|---|---|---|---|
| 6,427,547 B1 * | 8/2002 | Bowen ........................ | 74/329 |
| 6,427,549 B1 * | 8/2002 | Bowen ........................ | 74/331 |
| 6,712,734 B1 * | 3/2004 | Loeffler ....................... | 477/5 |
| 2003/0069103 A1 * | 4/2003 | Ibamoto et al. ................ | 475/5 |

FOREIGN PATENT DOCUMENTS

| | | | |
|---|---|---|---|
| DE | 19940288 C1 | | 3/2001 |
| EP | 0 845 618 A2 | | 6/1998 |
| EP | 1302697 A2 | | 4/2003 |
| JP | 10-089456 | | 4/1998 |
| JP | 2003-072403 | | 3/2003 |
| JP | 2003113932 A | * | 4/2003 |
| WO | WO 200026559 | * | 5/2000 |

* cited by examiner

*Primary Examiner*—Rodney H. Bonck
*Assistant Examiner*—David D. Le
(74) *Attorney, Agent, or Firm*—Crowell & Moring LLP

(57) ABSTRACT

In a counter shaft type transmission equipped with a pair of transmission gear trains, the input shaft of the first gear train is connected with the engine and the second gear train is connected with the engine via a motor. The torque of the first gear train is briefly shifted onto the second gear train while a gear change in the first gear train is accomplished. By setting the gear ratio of the second gear train to a half-position of gear ratio of the first gear train, motor capacity and battery capacity can be reduced, reducing transmission cost. Further, with the motor, torque transfer becomes possible for both up-shift and down-shift and, since continuous ratios can be achieved, drivability of an automobile improves.

13 Claims, 19 Drawing Sheets

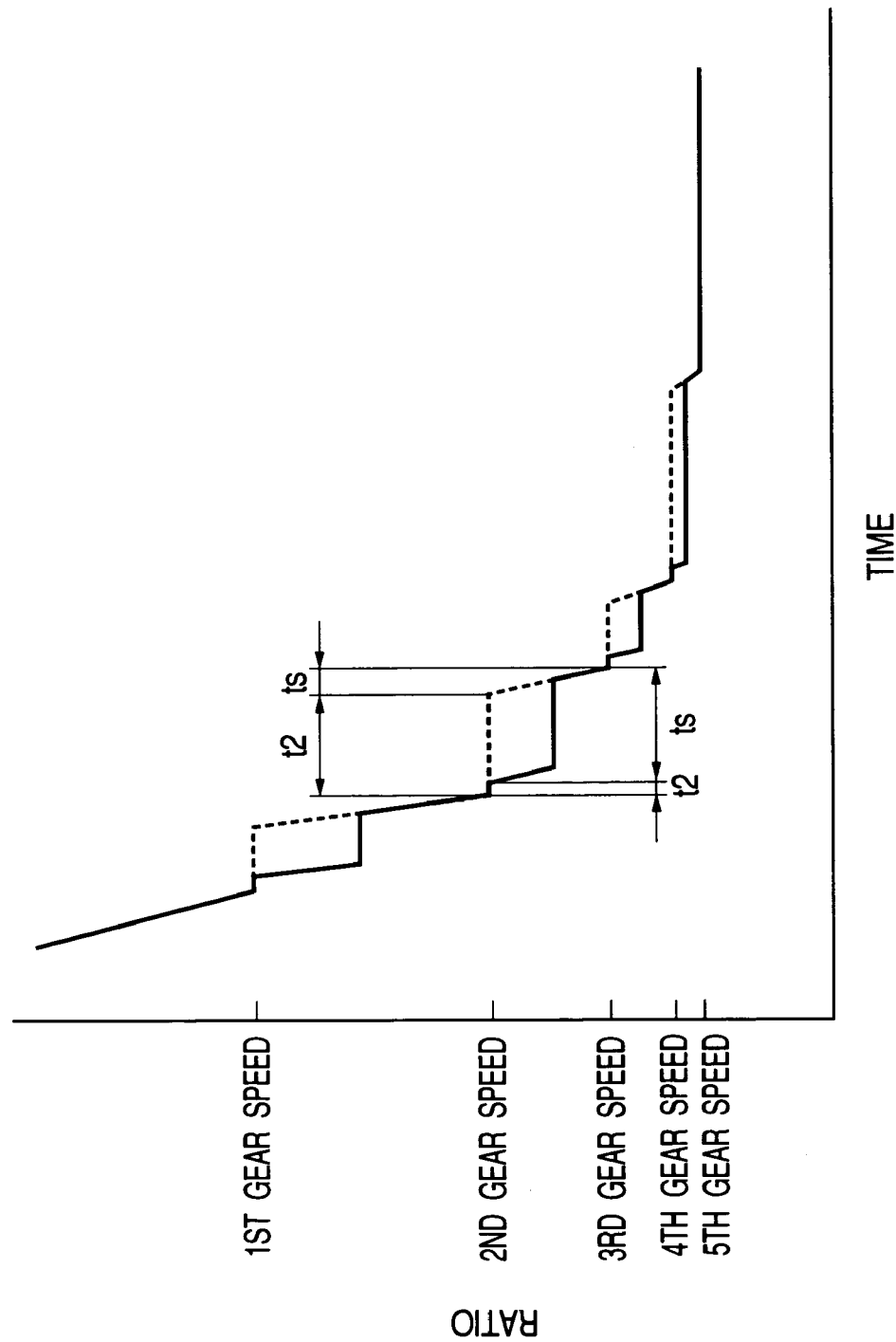

AUTOMATIC TRANSMISSION SYSTEM AND AUTOMOBILE USING THE SYSTEM

BACKGROUND OF THE INVENTION

The present invention relates to an automatic transmission, control equipment of automatic transmission, control method of automatic transmission, automatic transmission system, and an automobile using the system.

A conventional automatic transmission employs a planetary gear type or counter shaft type gear box, in which transmission is generally accomplished as an individual clutch selectively connected with one of the gear positions of different transmission gear ratio as shown in Japanese Laid-open Patent Publication No. Hei 10-89456.

SUMMARY OF THE INVENTION

The result of our analysis of the above prior art is as follows. The result below does not describe the prior art itself but is nothing more than an analytical result.

In the case of up-shift, as the on-coming clutch is started to be let in and the transmitting torque is increased gradually under half-clutched condition, torque transfer is caused in the so-called torque phase, that is, the transmitting torque of the off-going clutch decreases gradually, and as the off-going clutch is let off when all torque has transferred to the on-coming clutch, rotational speed change is caused in the so-called inertia phase, that is, the rotational speed of the engine decreases down to the input speed of the next gear.

In the case of down-shift, because the torque transfer from a high position gear with low potential of energy to a low position gear with high potential of energy cannot be accomplished theoretically even by increasing the transmitting torque of the on-coming clutch, the rotational speed change to increase the rotational speed of the engine is first accomplished by sliding the on-coming clutch, and then, when the on-coming clutch has synchronized, the clutch is let in to accomplish the torque transfer.

In the conventional transmission control, as explained above, torque transfer in the torque phase and release of energy of inertia in the inertia phase are accomplished by the frictional control of the clutch. This method, however, is inconvenient because the faceplate of the clutch is damaged due to friction and so the life becomes short. Besides, in this method, the transmitting torque is increased and decreased by adjusting the friction torque. However, because the μ-v characteristic of the friction torque has negative slope against the slip speed, it is extremely difficult to control the transmitting torque stably at a specified level, and so vibration of the transient torque is generated and a shift shock is caused or, in the worst case, the surface of the faceplate of the clutch is worn crinkly and sometimes damaged.

Particularly in down-shift to accelerate by stepping on the acceleration pedal, because torque transfer cannot be accomplished in the very beginning for a theoretical reason, there is no other alternative than to synchronize the rotational speed first so as to let a low position clutch in and then accomplish the torque transfer. Accordingly, response of torque applied is slow after stepping on the pedal, and since the torque transfer is caused rapidly, big shock is caused and besides, drivability is low.

An object of the present invention is to provide such automatic transmission system for automobile that eliminates the above-mentioned inconvenience and enables motor drive as well as regenerative braking under smooth and responsive transmission control that does not rely upon friction.

The present invention is equipped with the first drive train that transmits the power of an internal combustion engine to the drive shaft via the first transmission gear, the second drive train that transmits the power of the internal combustion engine to the drive shaft via the second transmission gear having different gear ratio from the first transmission gear, and a motor, installed between the shafts of the first drive train and second train, that transmits the torque relatively; and performs smooth and responsive transmission control that does not rely upon the friction control of the clutch by accomplishing the torque transfer in transmission by means of the torque generated by the motor and also accomplishing the rotational speed change in the inertia phase by means of the rotational speed control of the motor.

BRIEF DESCRIPTION OF DRAWINGS

FIG. 19 is a characteristic diagram showing the change of ratio according to the fifth embodiment of the invention.

DESCRIPTION OF THE PREFERRED EMBODIMENTS

Figure 1:
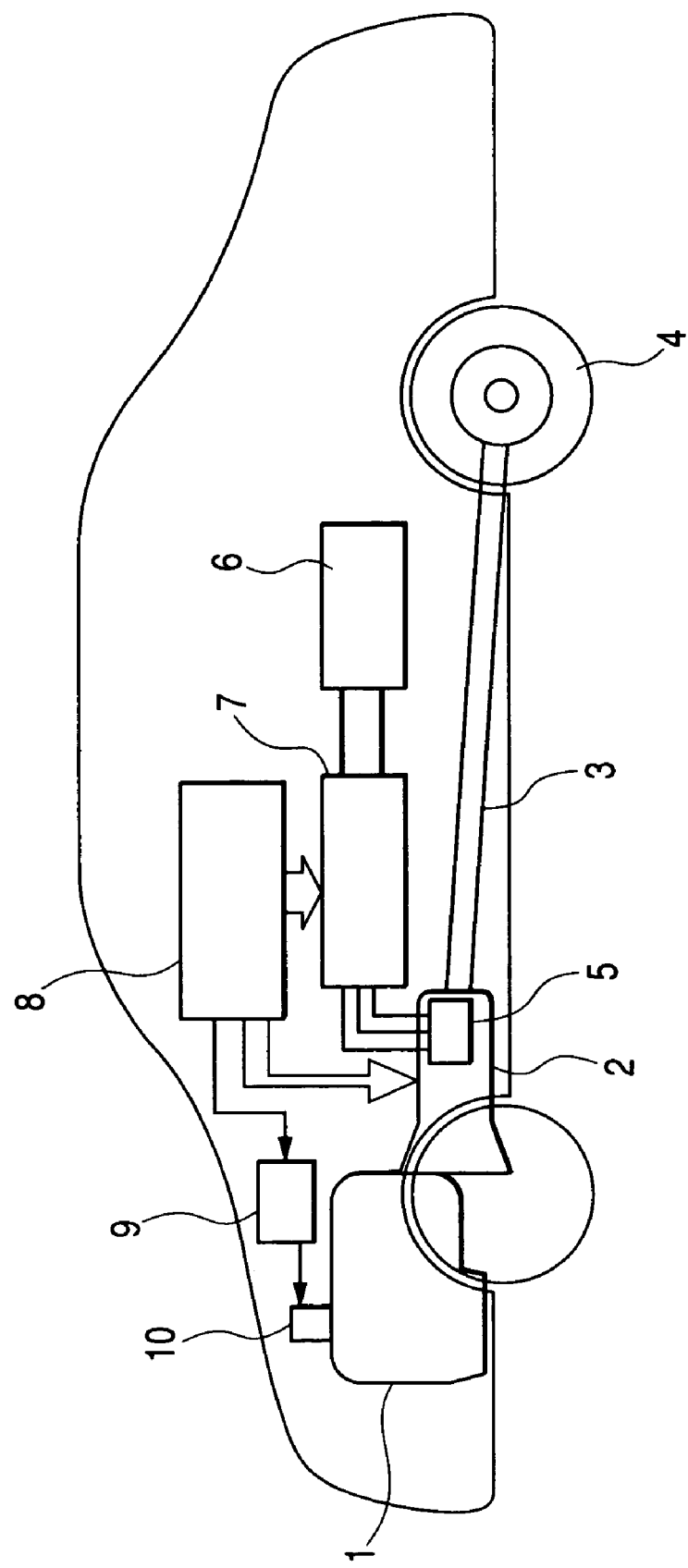
FIG. 1 is a conceptual diagram of the structure of an automobile equipped with the transmission of the invention.

FIG. 1 is a structural diagram showing the first embodiment of the present invention. The engine 1 of an automobile is connected with a transmission 2, and its output shaft 3 drives a tire 4 via a differential gear. A motor 5 is contained in the transmission 2. The motor 5 is connected with a control equipment 7 and a battery 6 is installed as the power supply to the motor control equipment 7.

The engine 1 is provided with an electronic control throttle valve 10 that controls the engine output based on a command signal.

A transmission control equipment 8 controls the toque and rotational speed of the motor 5 via the motor control equipment 7 and also controls the engine 1 output via the engine control equipment 9 and electronic control throttle valve 10. Besides, it commands operation to shift actuators 21–23 and 35–37, to be described later.

Figure 2:
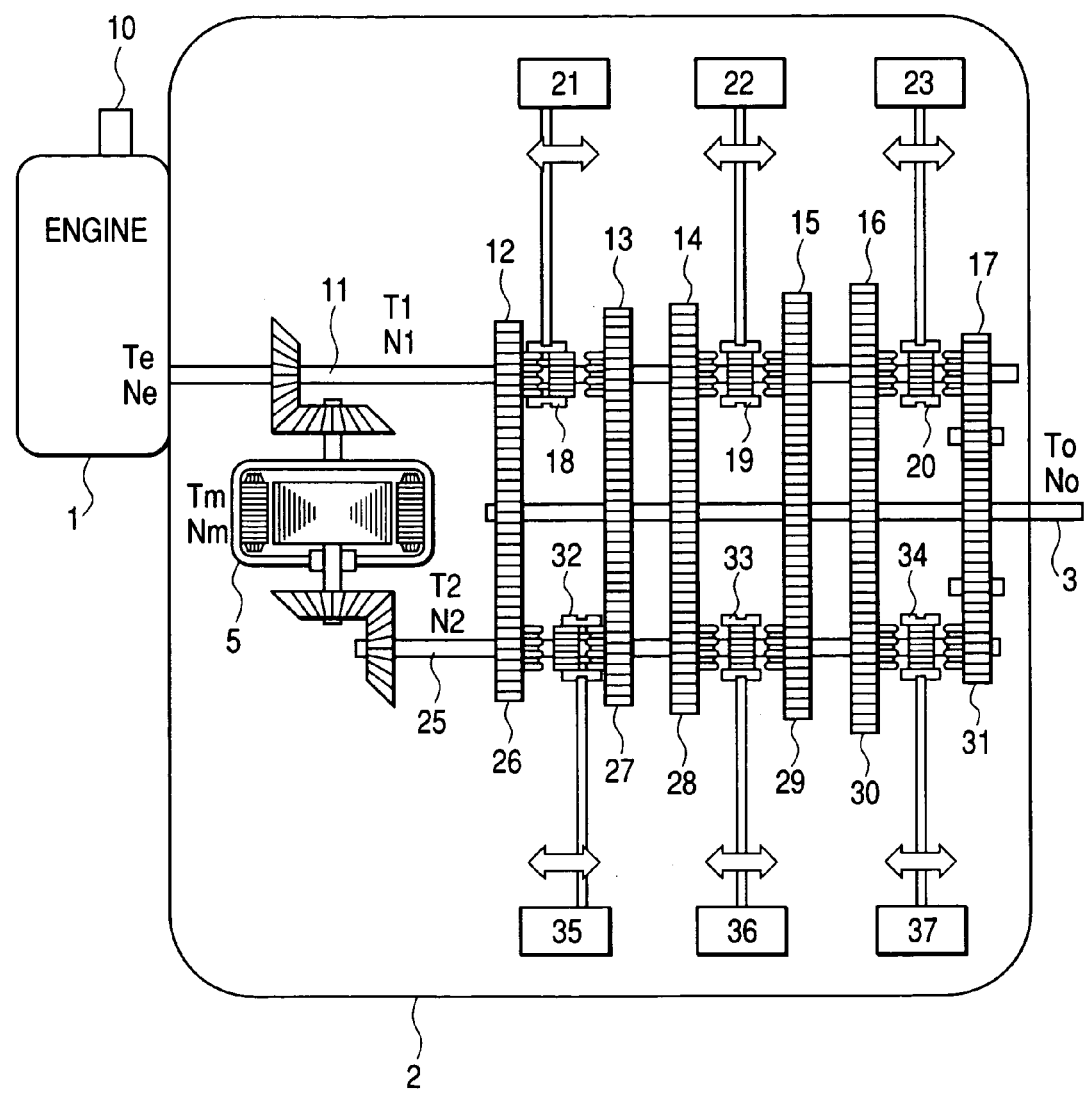
FIG. 2 is a structural diagram of the transmission according to the first embodiment of the invention.

FIG. 2 shows the structure of the transmission 2. The output shaft of the engine 1 is connected with a shaft 11.

The 1st gear 12, 2nd gear 13, 3rd gear 14, 4th gear 15, 5th gear 16 and reverse gear 17 are mounted rotating freely on the shaft 11. Dog clutches 18, 19 and 20 are mounted along with the transmission gears 12, 13, 14, 15, 16 and 17 so as to connect one of the transmission gears with the shaft 11. Driven gears engaged with these transmission gears 12, 13, 14, 15, 16 and 17 at each position are mounted on an output shaft 3.

In this embodiment, there is provided an additional shaft 25. The 0.5-th gear 26, 1.5-th gear 27, 2.5-th gear 28, 3.5-th gear 29, 4.5-th gear 30 and reverse gear 31 are mounted rotating freely on the shaft 25. Dog clutches 32, 33 and 34 are mounted along with the transmission gears 26, 27, 28, 29, 30 and 31 so as to connect the transmission gears 26, 27, 28, 29, 30 and 31 with the shaft 25. Driven gears engaged with these transmission gears 26, 27, 28, 29, 30 and 31 at each position are mounted on an output shaft 3.

Each of these dog clutches 18, 19, 20, 32, 33 and 34 is slid towards a target gear by a shift fork and engaged with the gear, and each shift fork is driven by each shift actuator 21–23 and 35–37. Each shift actuator drives each dog clutch separately. It is also permissible that, by means of a switching link mechanism, a target shift fork is selected and the clutches are slid by a single shift actuator.

A feature of this embodiment is that the motor 5 is connected between the shafts 11 and 25 and that the torque generated by the motor 5 is applied to the shafts 11 and 25. Each rotor and stator of the motor is connected with the shafts 11 and 25, respectively by means of bevel gears.

Figure 3:
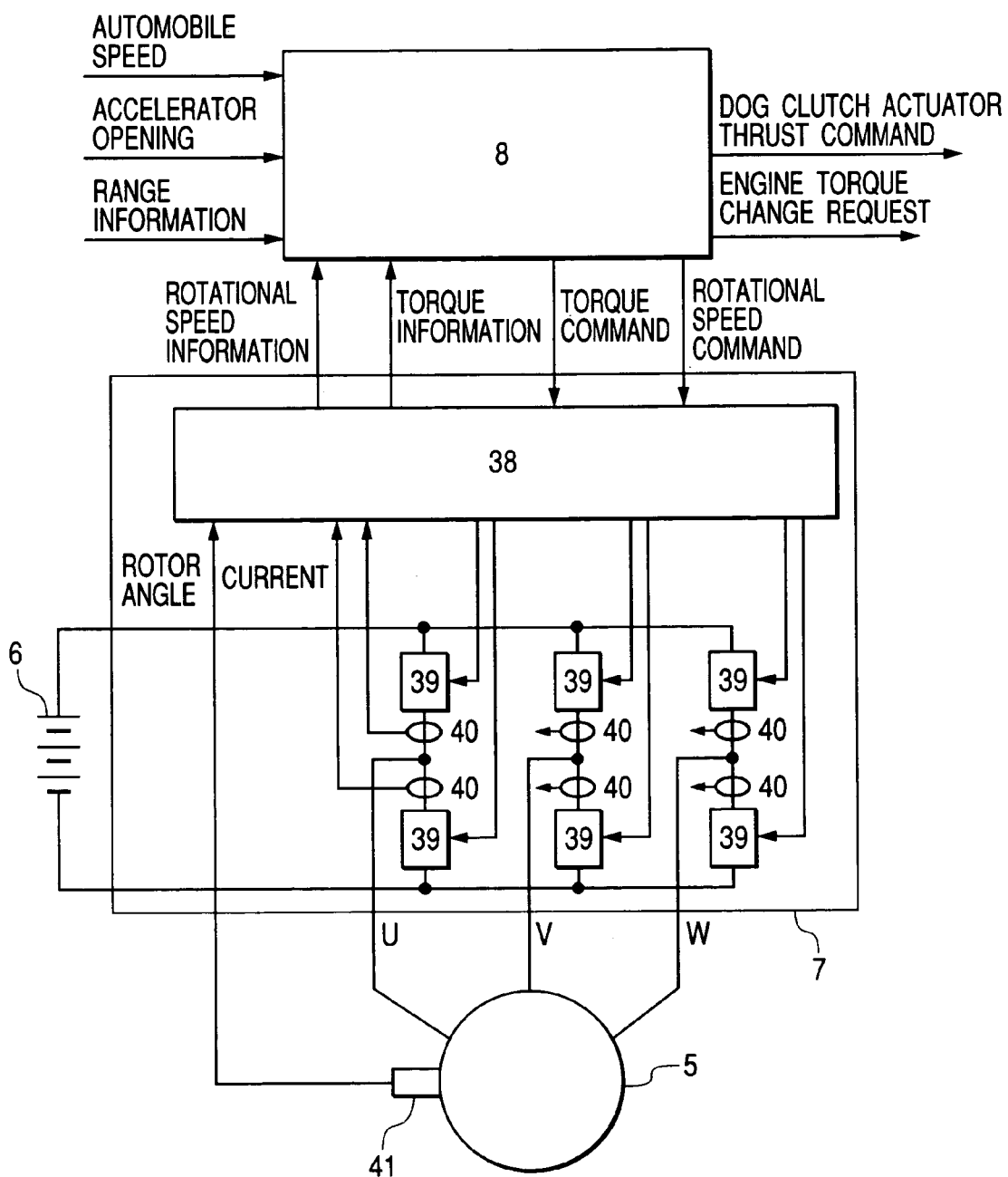
FIG. 3 is a block diagram showing the configuration of the motor control of the invention.

FIG. 3 shows the control diagram of the motor. The motor 5 is, for example, a permanent magnet synchronous motor, and 3-phase alternative current U, V and W is supplied to it from the motor control equipment 7. The arm of each phase of the inverter of the motor control equipment 7 is provided with a high-speed switching device 39, and direct current from the battery 6 is converted into variable-frequency 3-phase alternative current. The inverter control equipment 38 receives a torque command and rotational speed command from the transmission control equipment 8 and controls the duty ratio, and also feeds back the output of the current sensor 40 of each arm and that of the rotor angle detection position sensor 41 and so controls that the torque and rotational speed of the motor 5 conform to the command. Since the control like the above is a well-known technique in the power electronic field, further description is omitted.

Figure 4:
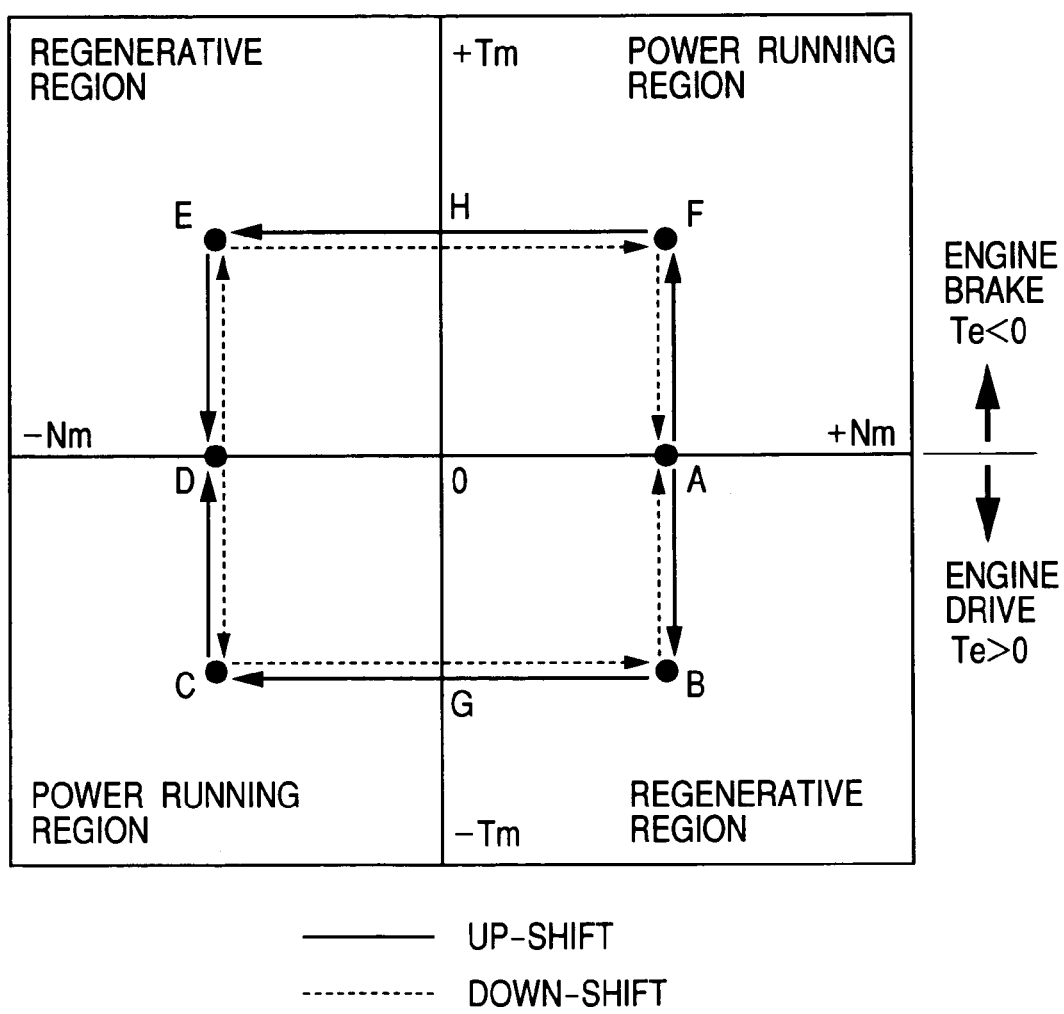
FIG. 4 is a characteristic diagram of the motor showing the movement of the motor operating point during the motor control in FIG. 3.

FIG. 4 shows the relationship between the torque and rotational speed of the motor. They are controlled through a so-called quadrant control by the motor control equipment 7. In the description hereunder, the direction of the motor torque is upwards from the motor in FIG. 2, that is, a direction along which the torque adds to the engine torque is regarded positive.

In the case of so-called power-on up-shift, where up-shifting is accomplished under acceleration by the engine torque, when the motor torque is generated in the torque phase, the operating point moves from point A to point B, and then to point C in the inertia phase, and to point D when the transmission is complete.

In the case of so-called power-on down-shift, where the engine torque is increased but down-shifting is needed due to deceleration in climbing a slope, because the rotational speed N1 of the shaft 11 is greater than the rotational speed N2 of the shaft 25 before transmission, the difference in the rotational speed is negative; and the operating point starting from point D in FIG. 4 moves to point C in the torque phase, to point B in the inertia phase, and to point A when the transmission is complete.

In the case of so-called LFUS (lift foot up-shift), which is caused when the acceleration pedal is stepped off during drive, although the operating point starts from point A, it moves from point A to point F in the torque phase because the direction of the torque is opposite due to engine braking, and then to point E in the inertia phase, and to point D when the transmission is complete.

In the case of so-called coast down, where downshifting is needed as the automobile speed decreases due to engine braking in high-speed drive, although the operating point starts from point D in FIG. 4, it moves to point E in the torque phase because the direction of the torque is opposite, and then to point F in the inertia phase, and to point A when the transmission is complete.

In the explanation herein, motor means a rotating electric device and it goes without saying that the type of the motor is not always limited to a permanent magnet synchronous motor but any one, such as induction motor or DC motor, is applicable provided that a quadrant control explained above is available.

Transmission control using the motor is explained hereunder. It is assumed that the motor torque Tm generated can be greater than the engine torque Te. Given that the gear ratio of the transmission gear connected with the shaft 11 is G (Shaft-1), gear ration of the transmission gear connected with the shaft 25 is G (Shaft-2), torque of the shaft 11 is T1, and torque of the shaft 25 is T2, the torque To of the output shaft 3 of the transmission is expressed by Formula 1.

$$To = G(\text{Shaft-1}) \times T1 + G(\text{Shaft-2}) \times T2 \quad \text{(Formula 1)}$$

Given that the direction along which the torque of the motor 5 helps rotate the shaft 11 is positive, the formula below holds true.

$$T1 = Te + Tm \quad \text{(Formula 2)}$$

$$T2 = -Tm \quad \text{(Formula 3)}$$

By substituting Formula 2 and Formula 3 in Formula 1 to obtain the output shaft torque To, the following formula is obtained.

$$To = G(\text{Shaft-1}) \times Te + [G(\text{Shaft-1}) - G(\text{Shaft-2})] \times Tm \quad \text{(Formula 4)}$$

Figure 5:
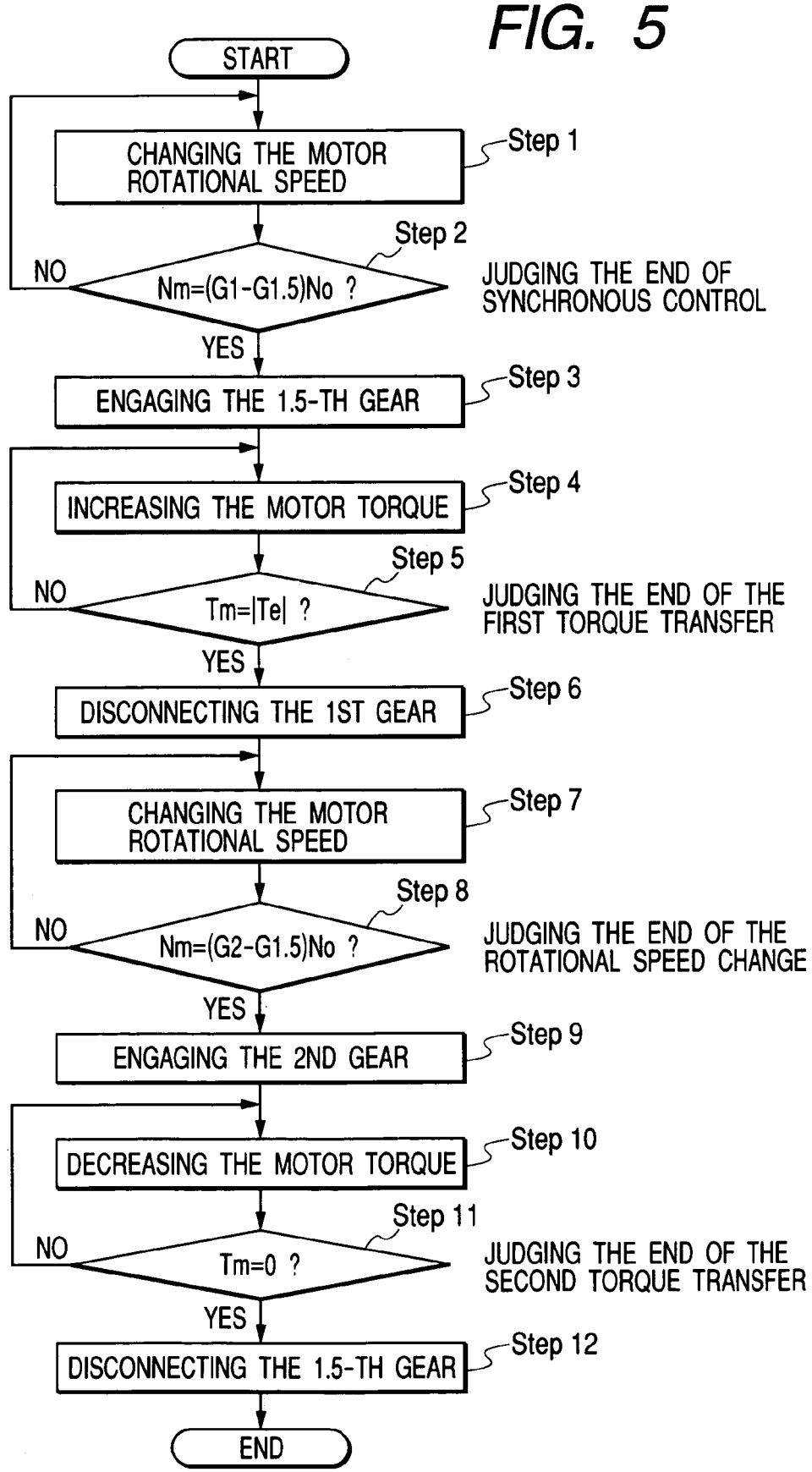
FIG. 5 is a flowchart showing the software configuration for the 1st to 2nd up-shift by the motor transmission control system of the invention.
Figure 6:
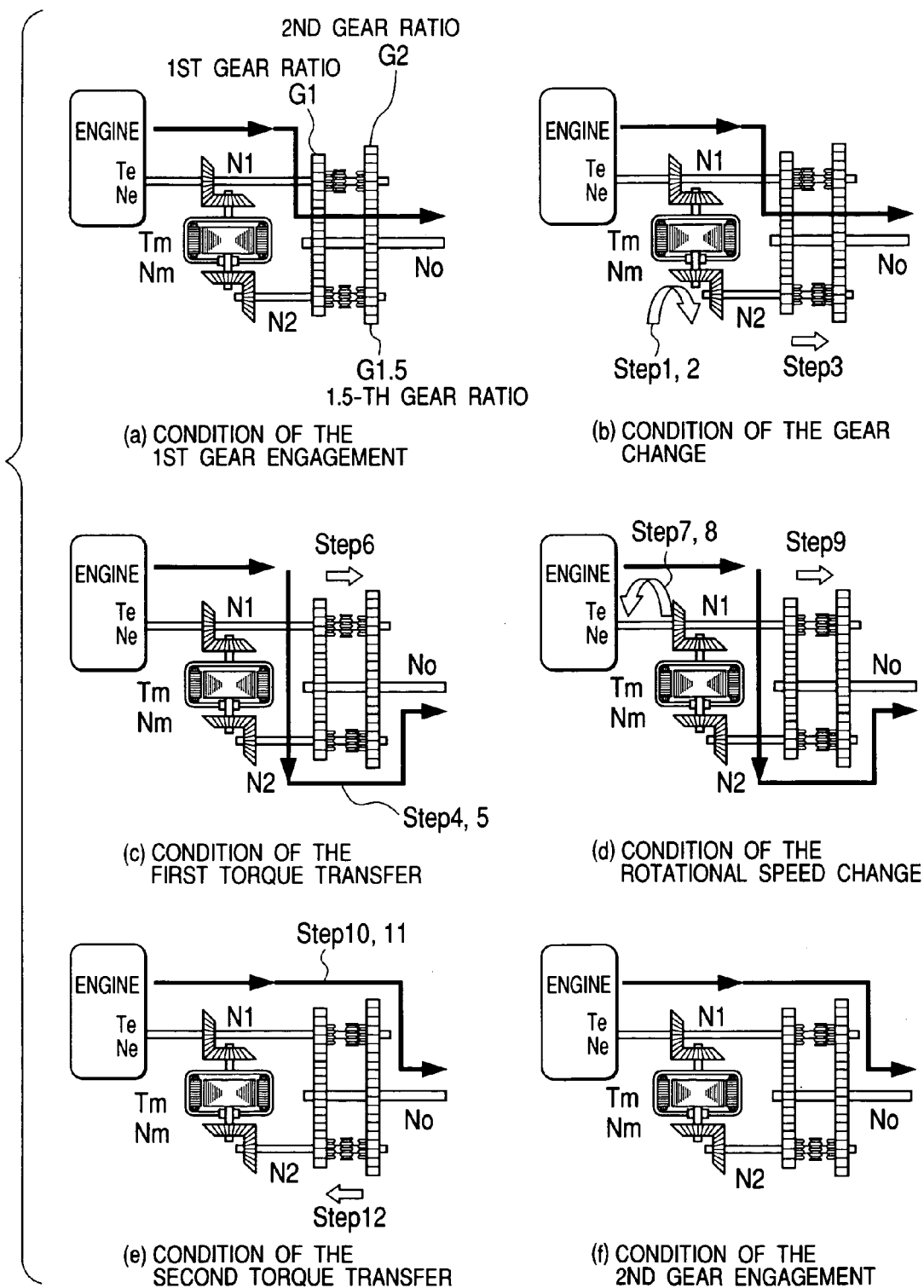
FIG. 6 is an explanatory figure showing the conditions of the change of torque train and operation of dog clutches in the power-on up-shift by the transmission control system in FIG. 5.
Figure 7:
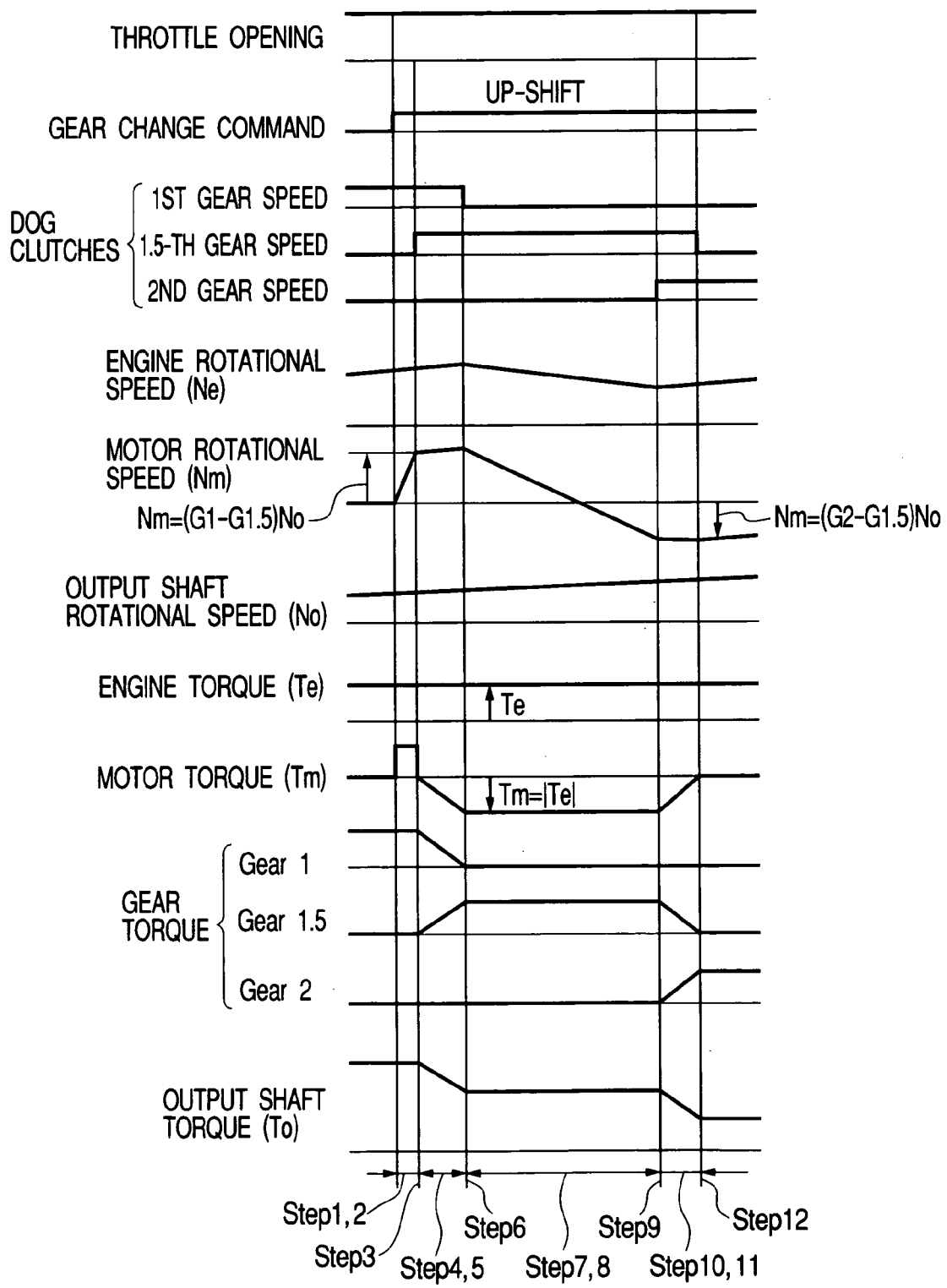
FIG. 7 is a timing chart showing the torque and rotational speed change in the power-on up-shift by the transmission control system in FIG. 5.

FIG. 5 is a flowchart of the control system in up-shift. Taking the 1st to 2nd power-on up-shift for example, conditions of the gear change and torque transfer are shown. FIG. 6 shows the conditions of the change of torque train and operation of dog clutches, making reference to each step in FIG. 5. FIG. 7 is a timing chart of the torque and rotational speed at each portion.

During a drive with the 1st gear connected, the rotational speed of the motor is controlled and varied in step 1 until the synchronism of the 1.5-th gear is judged in step 2. When the 1.5-th gear 27 is connected in step 3, the motor 5 is rotated at a rotational speed of (N1−N2).

In the up-shift, the operating point is located at point A in FIG. 4 just before the transmission. In other words, since the following applies, N1>N2 holds true and a value (N1−N2) is positive.

$$N2 = G1.5 \times No \quad \text{(Formula 5)}$$

$$N1 = G1 \times No \quad \text{(Formula 6)}$$

where G1.5 is the gear ratio of the 1.5-th gear and G1 is that of the 1st gear.

When the motor torque is increased in the negative direction (the direction along which the torque works as a driving force onto the output shaft and as a load onto the engine) in step 4, the input torque of the 1.5-th gear increases and the input torque of the 1st gear decreases. This is a torque transfer process called the torque phase.

Since the torque is transferred from the shaft 11 to the shaft 25 and so the motor torque Tm is made negative, the motor operating point moves to point B in FIG. 4. In this transfer, if the input torque T2 of the 1.5-th gear 27 increases according to Formula 3, the input torque T1 of the 1st gear 12 decreases according to Formula 2, and when Tm=−Te is met at point B, T1=0 and T2=Te are met.

In step 5, the transmission control equipment 8 judges the torque phase has ended. Whether the input torque of the 1st gear 12 becomes zero is judged here. Although the input torque of the gear cannot be directly detected in most cases, the input torque of the gear can be regarded equal to zero when the actual torque of the motor becomes equal to the absolute value of the engine torque (Tm=|Te|). For this judgment, it is necessary to obtain the engine torque Te through detection of calculation. How to obtain it is not explained herein because a concrete procedure has already been disclosed in the Japanese Laid-open Patent Publication Nos. Hei 05-240073 and Hei 06-317242 applied by the present inventor.

In step 6, the transmission control equipment 8 operates the shift actuator 21 to disconnect the 1st gear 12. Since T1=0 condition is met, the gear can be easily disconnected and no change is caused in the operation of the transmission.

When the 1st gear is disconnected, the rotational speed of the engine can now vary. When the transmission control equipment 8 generates a motor rotational speed change command in step 7, the rotational speed of the engine varies towards the input rotational speed of the 2nd gear. This is a rotational speed change process called the inertia phase.

In the 1st to 2nd up-shift, if the rotational speed of the motor is decreased with Tm=−Te being maintained, the rotational speed of the shaft 11 decreases, and so the direction of rotation is reversed at point G and the speed increases up to point C in the negative direction.

In step 8, the transmission control equipment 8 judges the inertia phase has ended. Judgment is made if the engine rotational speed has synchronized with the input rotational speed of the next position gear.

In step 9, the transmission control equipment 8 operates the shift actuator 21 and connects the dog clutch of the 2nd gear 13. Since a synchronized condition is met, the clutch can be connected easily and no change is caused in the operation of the transmission.

When the transmission control equipment 8 generates a motor torque decrease command in step 10 and the motor torque becomes zero, the engine torque Te that has been transmitted to the 1.5-th gear 27 via the motor 5 shifts to the 2nd gear 13. In this step, the operating point of the motor in FIG. 4 moves from point C to point D.

In step 11, when the motor torque Tm=0 is met, the transmission control equipment 8 judges the second torque phase has ended. In step 12, the transmission control equipment 8 operates the shift actuator 35 and disconnects the 1.5-th gear 27 to end the transmission. Since Tm=0 condition is met, the gear can be disconnected easily and no change is caused in the operation of the transmission.

Figure 8:
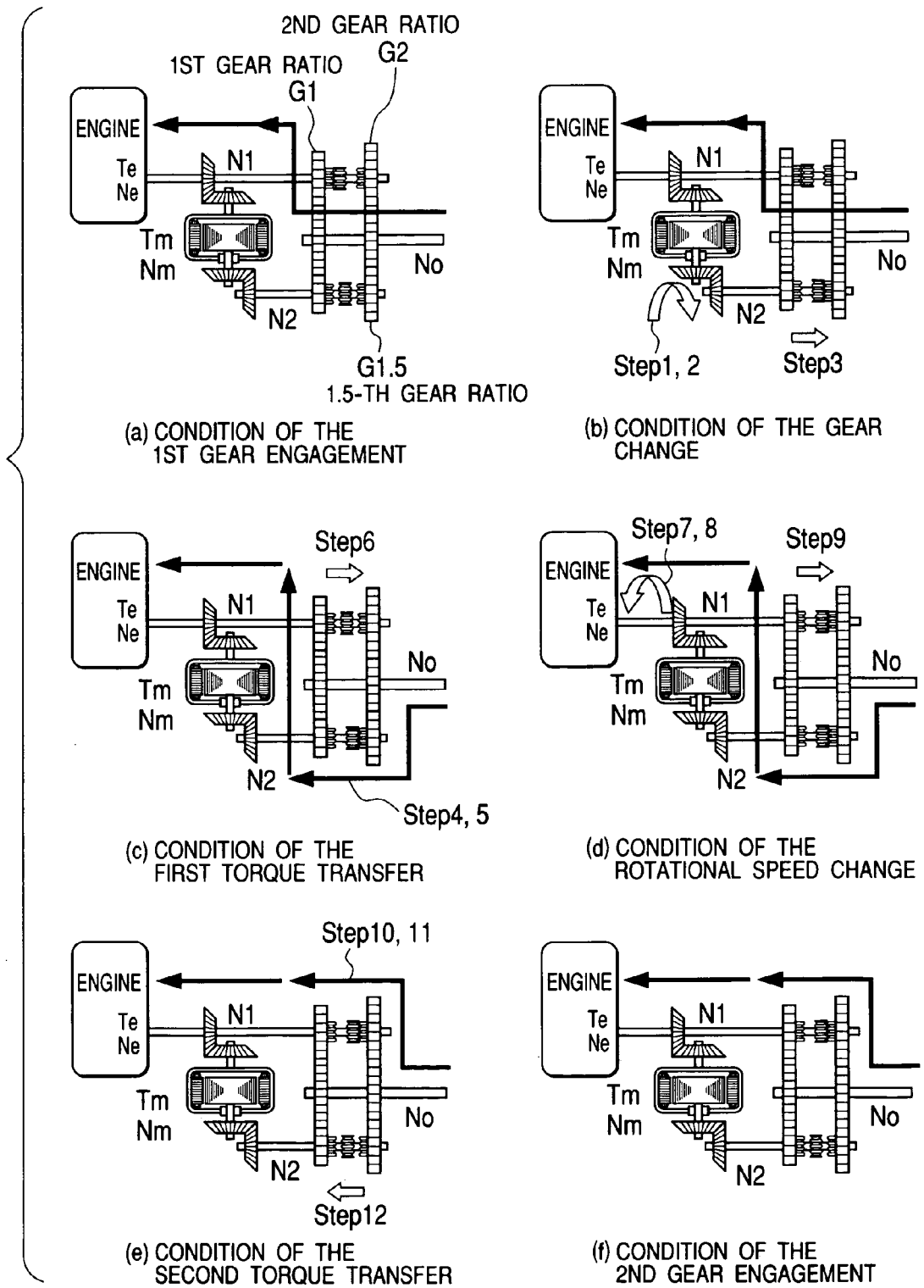
FIG. 8 is an explanatory figure showing the conditions of the change of torque train and operation of dog clutches in the lift-foot up-shift by the transmission control system in FIG. 5.

In the case of lift-foot up-shift, the algorithm in FIG. 5 is also applicable as it is. FIG. 8 shows the conditions of the change of torque train and operation of dog clutches, making reference to each step in FIG. 5.

Figure 9:
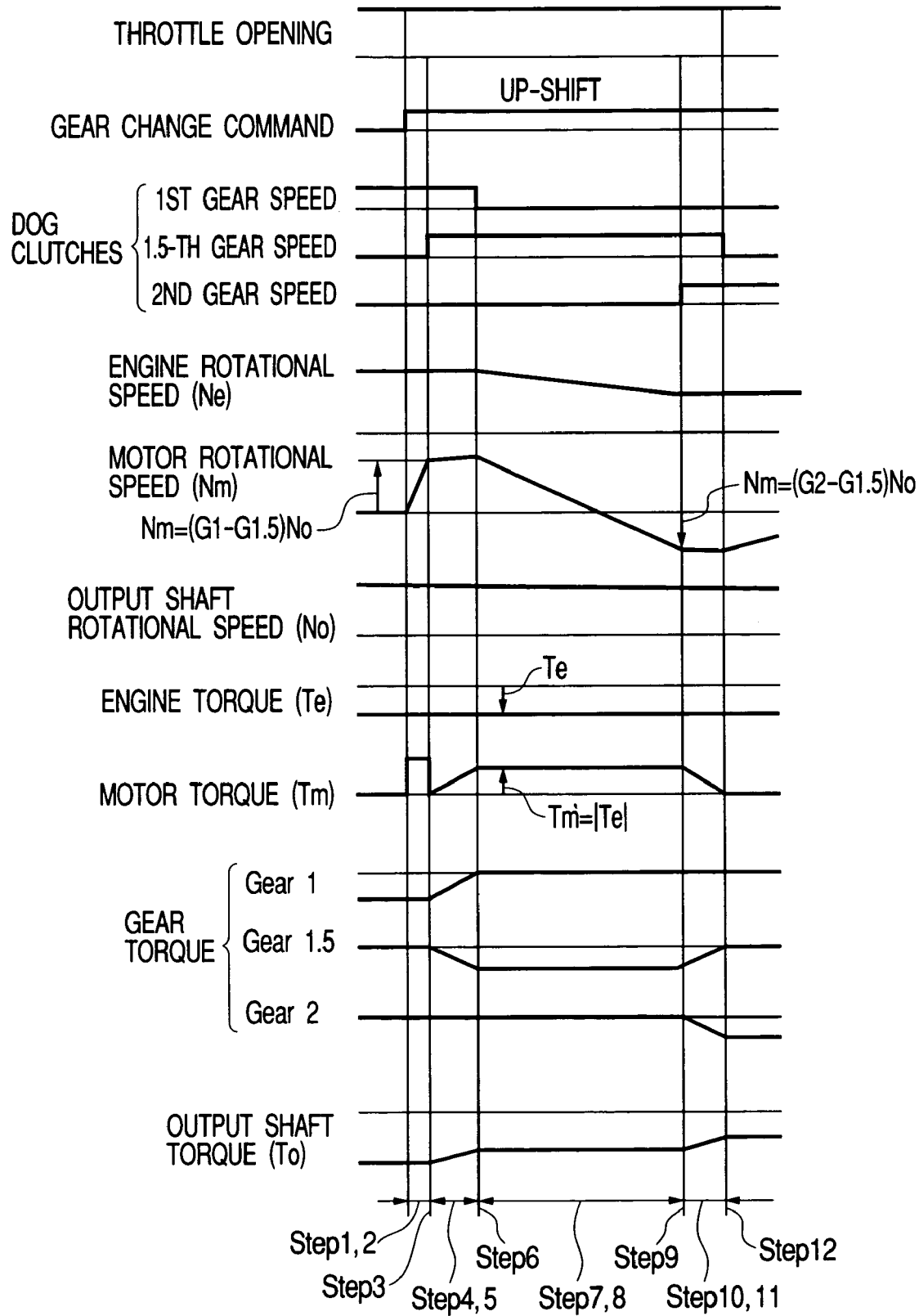
FIG. 9 is a timing chart showing the torque and rotational speed change in the lift-foot up-shift by the transmission control system in FIG. 5.

FIG. 9 is a timing chart of the torque and rotational speed at each portion. Step 1 to step 3 are exactly the same as in the case of the power-on up-shift.

When the motor torque is increased in the positive direction (the direction along which the torque works as a braking force onto the output shaft and adds to the engine output) in step 4, the negative torque of the 1.5-th gear increases and the negative torque of the 1st gear decreases. This is a torque transfer process called the torque phase. The operating point of the motor in FIG. 4 moves from point A to point F.

Since the torque is transferred from the shaft 11 to the shaft 25 and so the motor torque Tm is made negative, the input torque T2 of the 1.5-th gear 27 increases according to Formula 3, the input torque T1 of the 1st gear 12 decreases, and when Tm=−Te is met at point F, T1=0 and T2=Te are met.

In step 5, the transmission control equipment 8 judges the torque phase has ended. In step 6, the transmission control equipment 8 operates the shift actuator 21 to disconnect the 1st gear 12. Since T1=0 condition is met, the gear can be easily disconnected and no change is caused in the operation of the transmission.

When the 1st gear is disconnected, the rotational speed of the engine can now vary. When the transmission control equipment 8 generates a motor rotational speed change command in step 7, the rotational speed of the engine varies towards the input rotational speed of the 2nd gear. This is a rotational speed change process called the inertia phase.

In the 1st to 2nd up-shift, if the rotational speed of the motor is decreased, the rotational speed of the shaft 11 decreases, and so the direction of rotation is reversed at point H and the speed increases up to point E in the negative direction. In step 8, the transmission control equipment 8 judges the inertia phase has ended. Judgment is made if the engine rotational speed has synchronized with the input rotational speed of the next position gear.

In step 9, the transmission control equipment 8 operates the shift actuator 21 and connects the dog clutch of the 2nd gear 13. Since a synchronized condition is met, the clutch can be connected easily and no change is caused in the operation of the transmission.

When the transmission control equipment 8 generates a motor torque decrease command in step 10 and the motor torque becomes zero, the engine torque Te that has been transmitted to the 1.5-th gear 27 via the motor 5 shifts to the 2nd gear 13. In this step, the operating point of the motor in FIG. 4 moves from point E to point D.

In step 11, when the motor torque Tm=0 is met, the transmission control equipment 8 judges the second torque phase has ended. In step 12, the transmission control equipment 8 operates the shift actuator 35 and disconnects the 1.5-th gear 27 to end the transmission. Since Tm=0 condition is met, the gear can be disconnected easily and no change is caused in the operation of the transmission.

Figure 10:
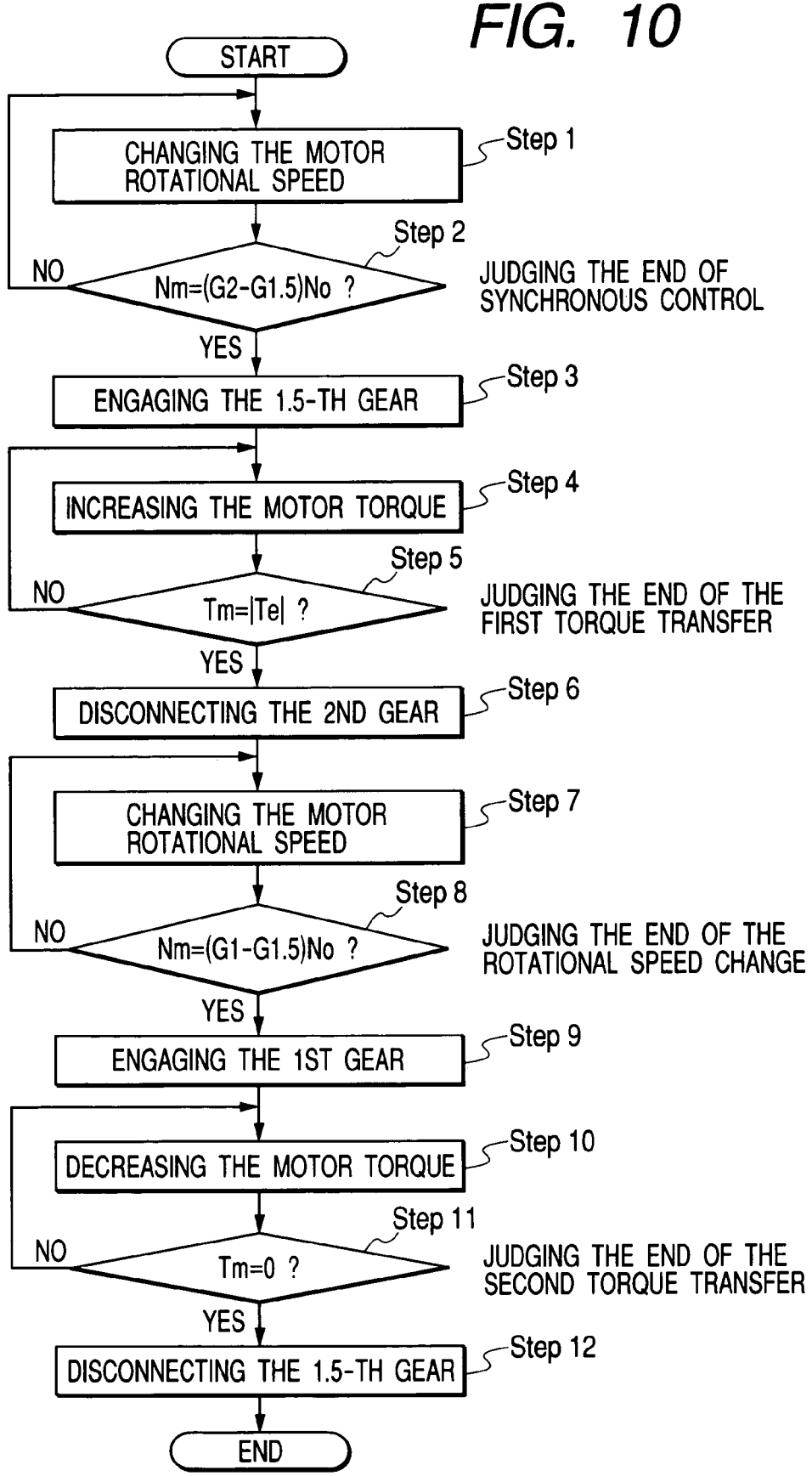
FIG. 10 is a flowchart showing the software configuration for the 2nd to 1st down-shift by the motor transmission control system of the invention.
Figure 11:
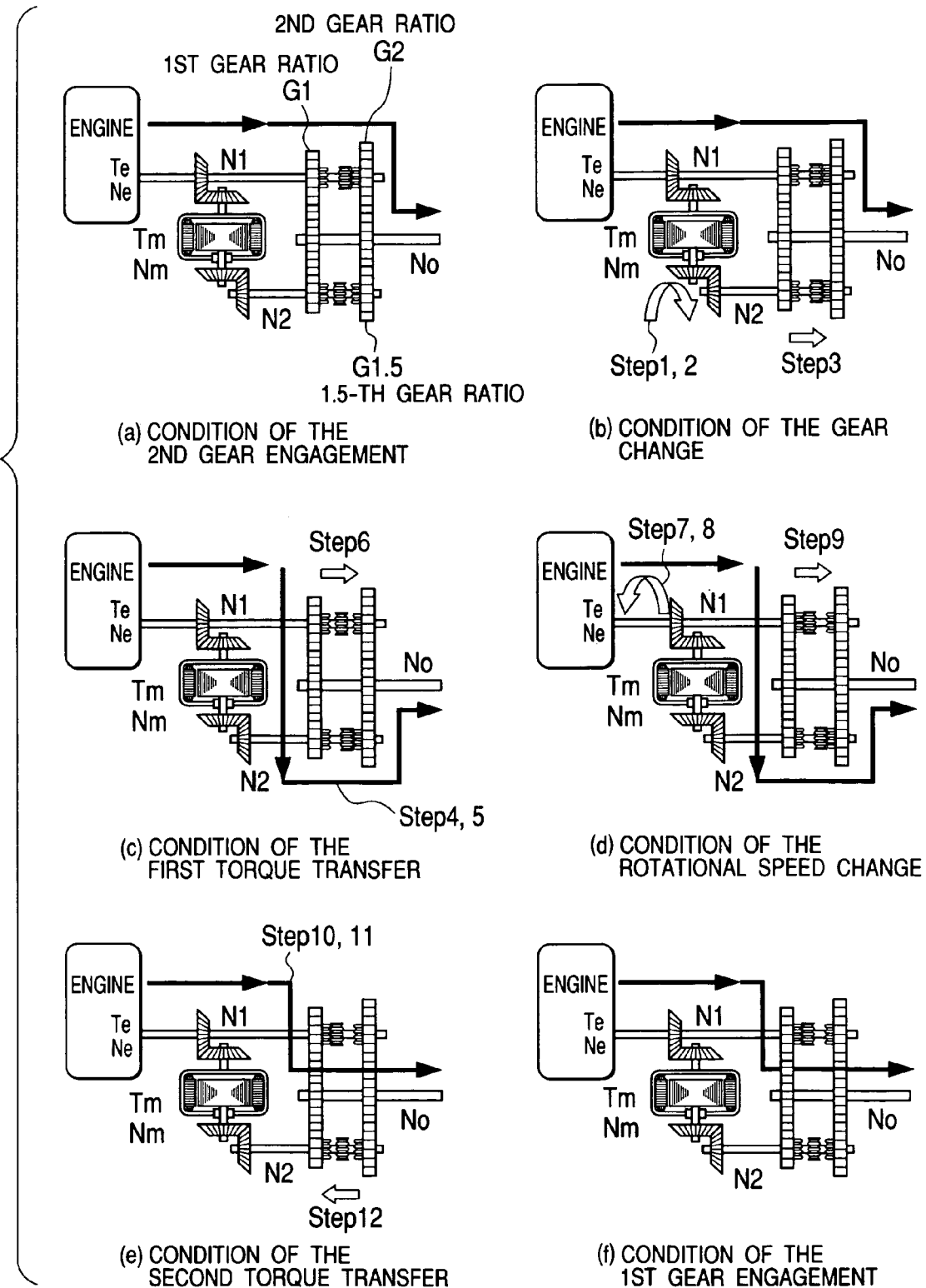
FIG. 11 is an explanatory figure showing the conditions of the change of torque train and operation of dog clutches in the power-on down-shift by the transmission control system in FIG. 10.
Figure 12:
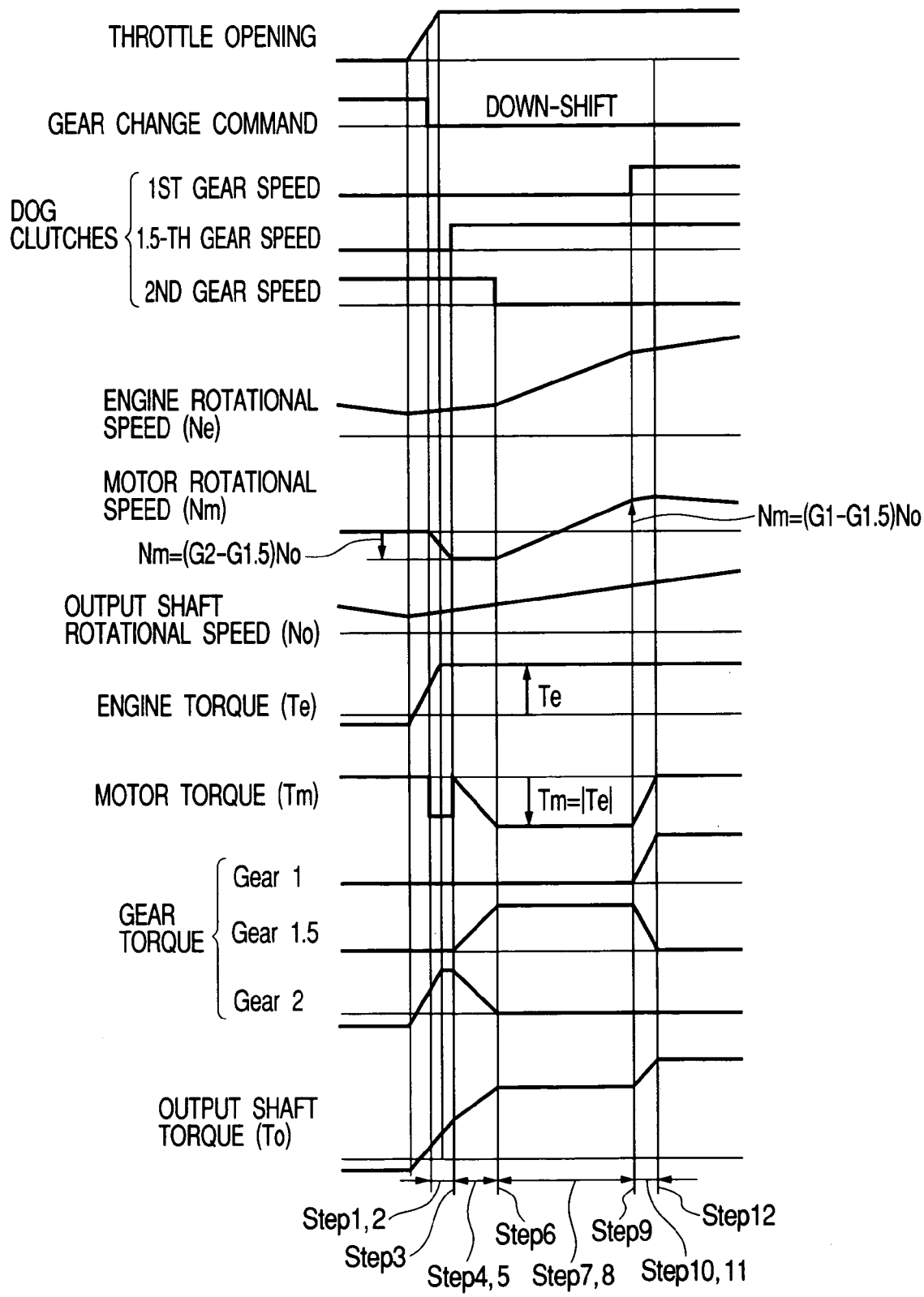
FIG. 12 is a timing chart showing the torque and rotational speed change in the power-on down-shift by the transmission control system in FIG. 10.

As understood from the explanation above, the figure differs from FIG. 7 only in the reverse direction of the torque and the relation of the rotational speed is exactly the same. Down-shift can be controlled in the same procedure. FIG. 10 is a flowchart of the control system in down-shifting. Taking the 2nd to 1st power-on down-shift for example, FIG. 11 shows conditions of the gear change and torque transfer. FIG. 12 is a timing chart of the torque and rotational speed at each portion. The operation in the down-shift is similar to the up-shift operation in which the direction of the rotational speed is changed symmetrically.

During a drive with the 2nd gear connected, the rotational speed of the motor is controlled and varied in step 1 until the synchronism of the 1.5-th gear is judged in step 2. When the 1.5-th gear 27 is connected in step 3, the motor 5 is rotated at a rotational speed of (N1−N2).

In the down-shift, the operating point is located at point D in FIG. 4 just before the transmission. In other words, since the following applies, N1<N2 holds true and a value (N1−N2) is negative.

$$N2 = G1.5 \times No \quad \text{(Formula 7)}$$

$$N1 = G1 \times No \quad \text{(Formula 8)}$$

When the motor torque is increased in the negative direction (the direction along which the torque works as a driving force onto the output shaft and as a load onto the engine) in step 4, the input torque of the 1.5-th gear increases and the input torque of the 2nd gear decreases. This is a torque transfer process called the torque phase.

Since the torque is transferred from the shaft 11 to the shaft 25 and so the motor torque is increased in the negative direction, the motor operating point moves from point D to point C in FIG. 4. In this transfer, if the input torque T2 of the 1.5-th gear 27 increases according to Formula 3, the input torque T1 of the 2nd gear 13 decreases according to Formula 2, and when Tm=−Te is met at point C, T1=0 and T2=Te are met.

In step 5, the transmission control equipment 8 judges the torque phase has ended. Whether the input torque of the 2nd gear 13 becomes zero is judged here. If the input torque of the gear cannot be directly detected, judgment as to whether the actual torque of the motor becomes equal to the absolute value of the engine torque (Tm=|Te|) will do.

In step 6, the transmission control equipment 8 operates the shift actuator 21 to disconnect the 2nd gear 13. Since T1=0 condition is met, the gear can be easily disconnected and no change is caused in the operation of the transmission.

When the 2nd gear is disconnected, the rotational speed of the engine can now vary. When the transmission control equipment 8 generates a motor rotational speed change command in step 7, the rotational speed of the engine varies towards the input rotational speed of the 1st gear. This is a rotational speed change process called the inertia phase.

In the 2nd to 1st down-shift, if the rotational speed of the motor is increased with Tm=−Te being maintained, the rotational speed of the shaft 11 increases, and so the direction of rotation is reversed at point G and the speed increases up to point B in the positive direction.

In step 8, the transmission control equipment 8 judges the inertia phase has ended. Judgment is made if the engine rotational speed has synchronized with the input rotational speed of the next position gear.

In step 9, the transmission control equipment 8 operates the shift actuator 21 and connects the dog clutch of the 1st gear 12. Since a synchronized condition is met, the clutch can be connected easily and no change is caused in the operation of the transmission.

When the transmission control equipment 8 generates a motor torque decrease command in step 10 and the motor torque becomes zero, the engine torque Te that has been transmitted to the 1.5-th gear 27 via the motor 5 shifts to the 1st gear 12. In this step, the operating point of the motor in FIG. 4 moves from point B to point A.

In step 11, when the motor torque Tm=0 is met, the transmission control equipment 8 judges the second torque phase has ended. In step 12, the transmission control equipment 8 operates the shift actuator 35 and disconnects the 1.5-th gear 27 to end the transmission. Since Tm=0 condition is met, the gear can be disconnected easily and no change is caused in the operation of the transmission.

Figure 13:
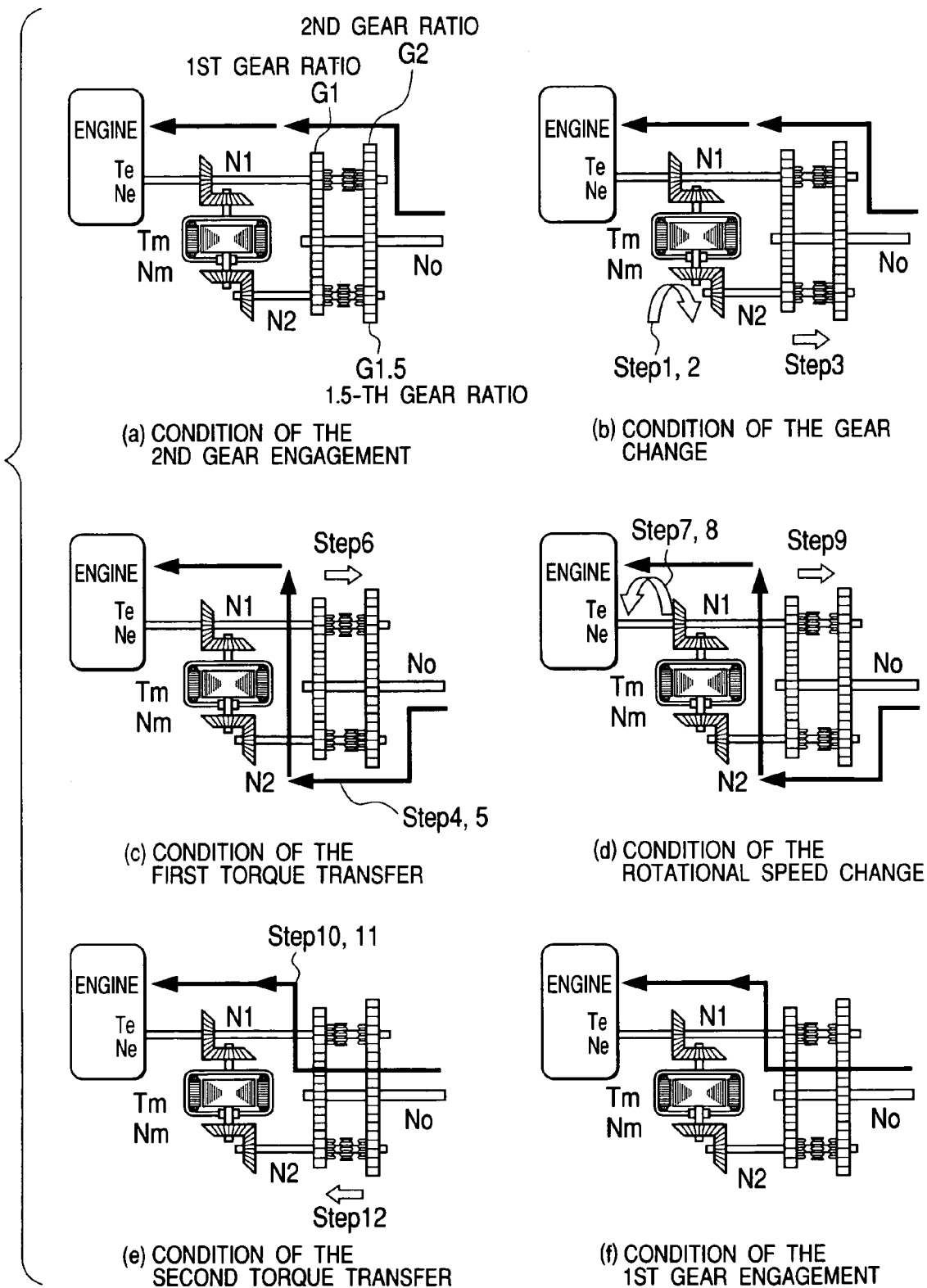
FIG. 13 is an explanatory figure showing the conditions of the change of torque train and operation of dog clutches in the coast down-shift by the transmission control system in FIG. 10.

In the case of coast down-shift, the algorithm in FIG. 10 is also applicable as it is. FIG. 13 shows the conditions of the change of torque train and operation of dog clutches, making reference to each step in FIG. 10.

Figure 14:
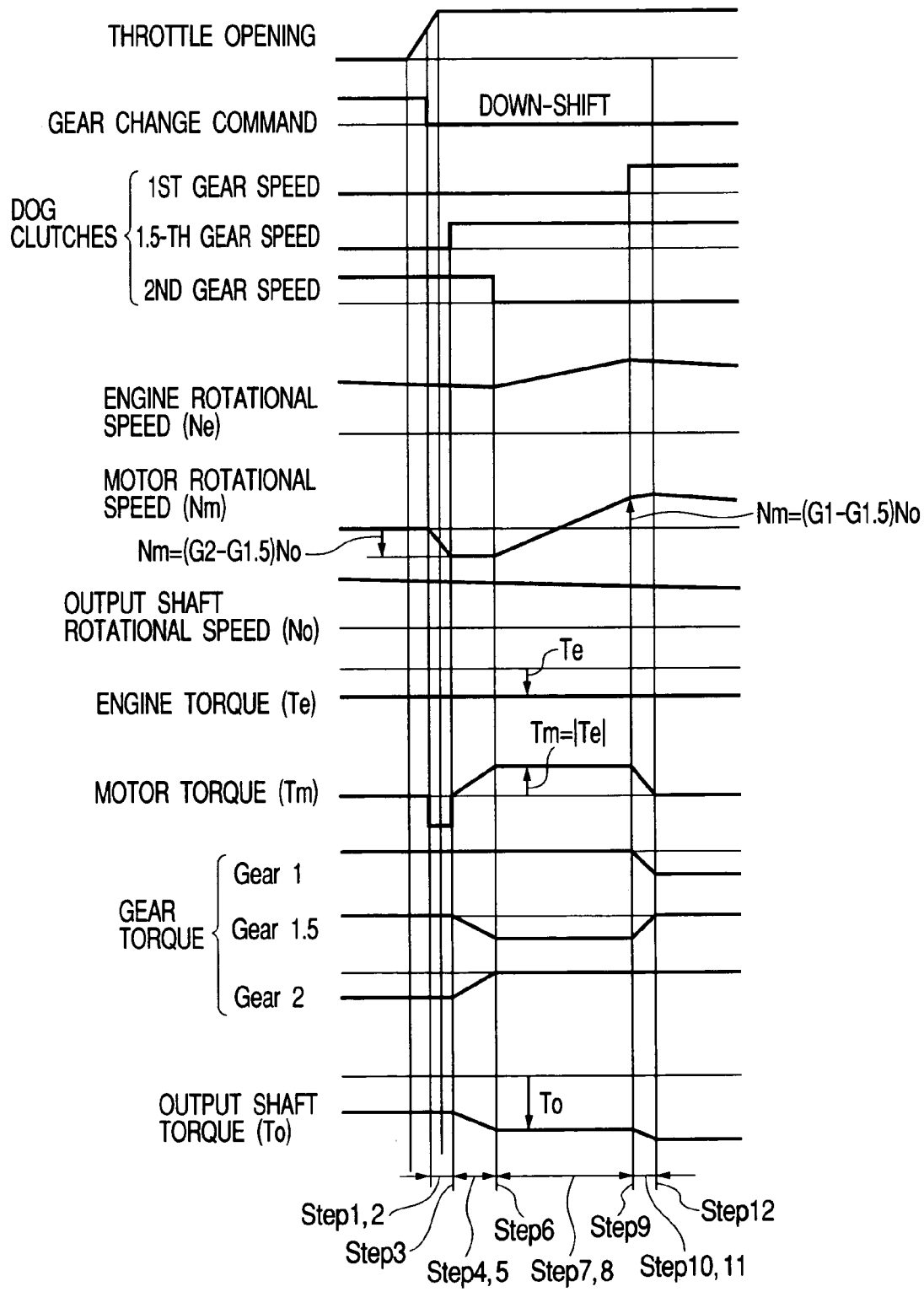
FIG. 14 is a timing chart showing the torque and rotational speed change in the coast down-shift by the transmission control system in FIG. 10.

FIG. 14 is a timing chart of the torque and rotational speed at each portion. Step 1 to step 3 are exactly the same as in the case of the power-on down-shift. When the motor torque is increased in the positive direction (the direction along which the torque works as a braking force onto the output shaft and adds to the engine output) in step 4, the negative torque of the 1.5-th gear increases and the negative torque of the 2nd gear decreases. This is a torque transfer process called the torque phase.

Since the torque is transferred from the shaft 11 to the shaft 25 and so the motor torque Tm is made negative, the input torque T2 of the 1.5-th gear 27 increases according to Formula 3, the input torque T1 of the 2nd gear 12 decreases, and when Tm=−Te is met at point E, T1=0 and T2=Te are met.

In step 5, the transmission control equipment 8 judges the torque phase has ended. In step 6, the transmission control equipment 8 operates the shift actuator 21 to disconnect the 2nd gear 13. Since T1=0 condition is met, the gear can be easily disconnected and no change is caused in the operation of the transmission.

When the 2nd gear is disconnected, the rotational speed of the engine can now vary. When the transmission control equipment 8 generates a motor rotational speed change command in step 7, the rotational speed of the engine varies towards the input rotational speed of the 1st gear. This is a rotational speed change process called the inertia phase.

In the 2nd to 1st coast down-shift, if the rotational speed of the motor is increased, the rotational speed of the shaft 11 increases, and so the direction of rotation is reversed at point H and the speed increases up to point F in the positive direction.

In step 8, the transmission control equipment 8 judges the inertia phase has ended. Judgment is made if the engine rotational speed has synchronized with the input rotational speed of the next position gear.

In step 9, the transmission control equipment 8 operates the shift actuator 21 and connects the dog clutch of the 1st gear 12. Since a synchronized condition is met, the clutch can be connected easily and no change is caused in the operation of the transmission.

When the transmission control equipment 8 generates a motor torque decrease command in step 10 and the motor torque becomes zero, the engine torque Te that has been transmitted to the 1.5-th gear 27 via the motor 5 shifts to the 1st gear 12. In this step, the operating point of the motor in FIG. 4 moves from point F to point A.

In step 11, when the motor torque Tm=0 is met, the transmission control equipment 8 judges the second torque phase has ended. In step 12, the transmission control equipment 8 operates the shift actuator 35 and disconnects the 1.5-th gear 27 to end the transmission. Since Tm=0 condition is met, the gear can be disconnected easily and no change is caused in the operation of the transmission.

As understood from the explanation above, the figure differs from FIG. 12 only in the reverse direction of the torque and the relation of the rotational speed is exactly the same.

Figure 15:
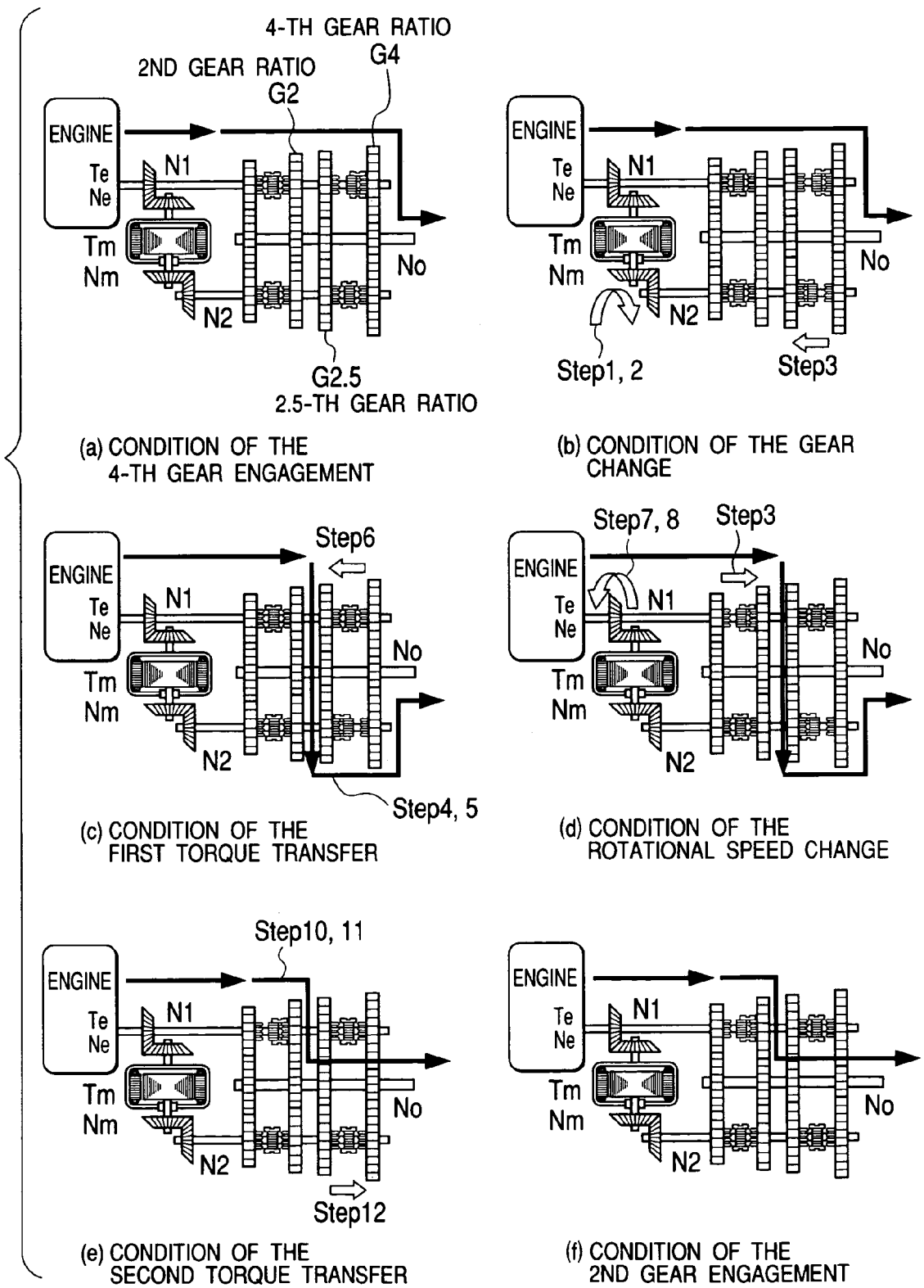
FIG. 15 is an explanatory figure showing the conditions of the change of torque train and operation of dog clutches in the 4th to 2nd jump shift by the transmission control system in FIG. 10.

Although the above explanation on FIG. 5 through FIG. 14 is based on examples of shifting to the adjacent gear position, jump shift is also possible with this system. Taking the 4th to 2nd power-on down-shift for example, FIG. 15 shows the conditions of the change of torque train and operation of dog clutches. It is well understood that, even if the gear position to shift to is apart, such as from the 2nd to the 4th, transmission can be accomplished in exactly the same was as shifting to the adjacent gear position. The timing chart of the torque and rotational speed exhibits exactly the same waveform as in FIG. 12 except that the gears used for transmission are different.

With a conventional twin clutch transmission, for example, in the case when jump shift is needed, transmission can be accomplished only by interrupting the torque because power-on shift is not available. With this system, however, since transmission can be accomplished in a complete way, drivability improves.

With a system according to this embodiment, remarkable effect as below can be attained. The motor output needed for transmission reaches the maximum when the motor operates at point B or point C in FIG. 4, and is expressed by the formula below.

$$Pm=|N1-N2| \times Te \quad \text{(Formula 9)}$$

The energy needed for transmission is expressed by an "area surrounded by points A, B, C and D"×Time in FIG. 4. Since an area surrounded by the origin, point A, point B and point G lies in the fourth region of the quadrant, which is the regenerative region, the battery is charged with energy. Since an area surrounded by the origin, point D, point C and point G lies in the third region of the quadrant, energy is supplied from the battery. In other words, in power-on up-shift, the battery is charged in the first half of the transmission and discharges in the second half. In power-on down-shift, on the contrary, the battery discharged in the first half of the transmission and is charged in the second half. In lift-foot up-shift and coast down-shift, the operation is accomplished in the first and second regions but charging and discharging of the battery is caused in a similar manner in a single transmission cycle.

Since, as explained above, the battery condition returns to the original state after a single cycle of transmission is complete, the battery capacity needed for transmission is no more than a capacity enough for charging and discharging the energy represented by an area ABG0.

In a conventional similar electric transmission system, the total area ABCD lies in the charging region in up-shift and in the discharging region in down-shift. Because of this, in the case of up-shifting up to the 5th gear position and then downshifting down to the 1st gear position, the battery needs to repeat charging five times and then repeat discharging five times, which means the battery capacity must be 5 times greater than the area ABCD. Compared to this, the battery capacity needed with the present system is $\frac{1}{10}$, and so remarkable economic effect is attained.

Figure 16:
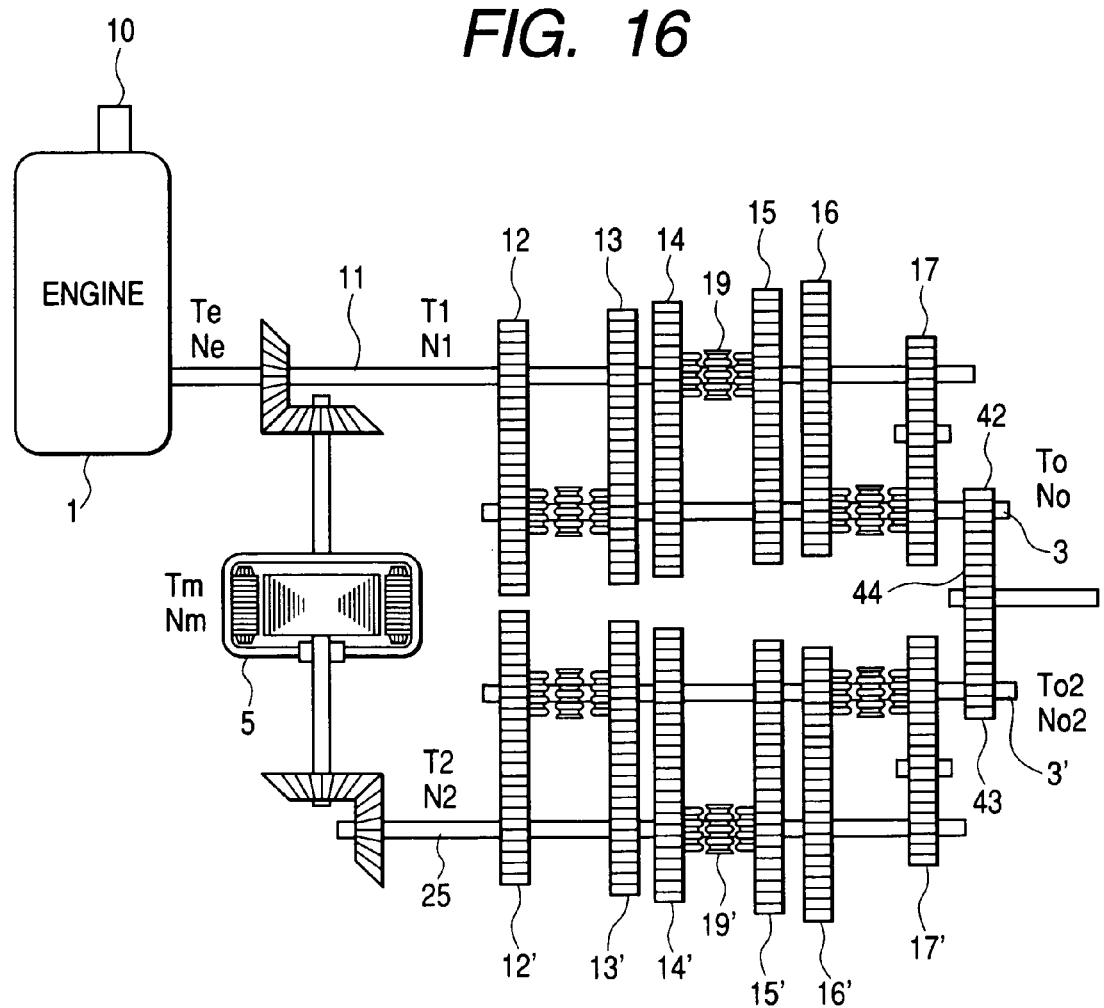
FIG. 16 is a theoretical model showing the structure of the transmission according to the second embodiment of the invention.

FIG. 16 is a structural diagram showing the second embodiment of the present invention. The transmission gear train on the shaft 11 is exactly the same as that of the shaft 25. Accordingly, the same symbol added with dash (') is given to each part. The driven gear train on the shaft 3 is the same as that on the shaft 3'. The output shaft 3 and additional output shaft 3' are connected with the final gear 44 using the gears 42 and 43 of different gear ratio. By setting the final gear ratio of the output shaft 3' greater than that of the output shaft 3, the transmission gear 13' turns to have a gear ratio equivalent to that of the 1.5-th gear, and the transmission gears 14', 15' and 16' equivalent to the 2.5-th, 3.5-th and 4.5-th, respectively. Exactly the same transmission control as for the transmission in FIG. 2 can be performed.

With this system, since designing new transmission gears of the 1.5-th to 4.5-th is not necessary but simply installing a pairs of the same conventional gear trains will do, development cost can be drastically reduced. Besides, since installing new machine tools for making new gear train is not necessary, the effect of cost reduction is further remarkable.

Although the dog clutches are all mounted on the shaft 11 and 25 in FIG. 2, it is no longer necessary to mount all dog clutches on the input side because two separate output shafts 3 and 3' are installed. For example, if the dog clutch 18 for shifting from the 1st to the 2nd is mounted on the output shaft 3, the location of the shift fork can be designed without difficulty, and so the design freedom improves.

Figure 17:
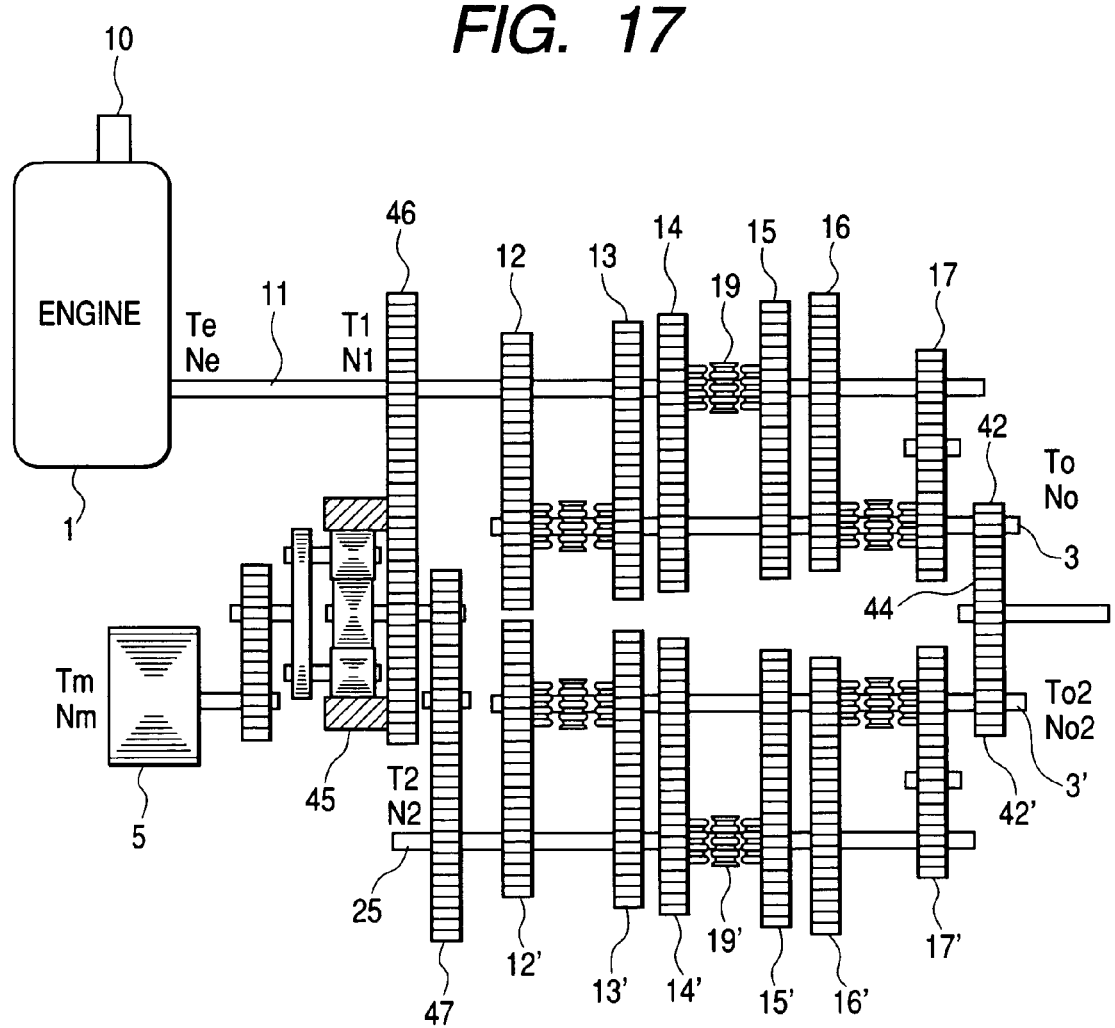
FIG. 17 is a theoretical model showing the structure of the transmission according to the third embodiment of the invention.

FIG. 17 is a structural diagram showing the third embodiment of the present invention. In this embodiment, a planetary gear 45 is employed and its ring gear is connected with the connecting gear 46 of the shaft 11, its sun gear is connected with the connecting gear 47 of the shaft 25, and its carrier is connected with the motor 5. Connection with the final gear is similar to that in the second embodiment, that is, the final gear ratio of the output shaft 3' is set greater than that of the output shaft 3.

As a result of this setting, the shaft 11 and 25 are twisted in the opposite direction to each other by the torque of the motor 5. When the gear ratio of each connecting gear is set according to the formula below, the rotational speed of the motor becomes the difference of rotational speed between the shafts 11 and 25.

Given the number of teeth of the sun gear of the planetary gear 45 is Zs and that of the ring gear is Zr, the rotational speed Nc of the carrier of the planetary gear is generally expressed by Formula 10.

$$Nc=Ns*Zs/(Zs+Zr)+Nr*Zr/(Zs+Zr) \quad \text{(Formula 10)}$$

If the connecting ratio of the ring gear to the connecting gear 46 is set (−k1), Nr=−k1N1 is met. If the connecting ratio of the sun gear to the connecting gear 47 is set (Zr/Zs)k1, Ns=(Zr/Zs)k1N2 is met. If the carrier is reversely connected with the motor at a −{Zr/(Zs+Zr)}k1 times deceleration ratio, Nc=−Nm*Zr/(Zs+Zr)k1 is met. By substituting these in Formula 10, the following is obtained.

−Nm*Zr/(Zs+Zr)k1=N2*Zr/(Zs+Zr)k1−N1*Zr/(Zs+Zr)k1    (Formula 11)

the connection is made so that the motor rotational speed becomes the difference of the rotational speed between the shafts 11 and 25, and so the operation is exactly equal to that in FIG. 2.

With this system, since it is not necessary to rotate both the rotor and stator, the structure can be simplified. Besides, since it is not necessary to supply power to the rotating section, slip ring becomes no longer necessary and a remarkable economic effect is attained.

In the connection with the final gear, if the gear 42' having the same gear ratio as the output shaft 3 is connected with the final gear 44 and accordingly the connecting ratio of the sun gear with the connecting gear is set greater than (Zr/Zs)k1, exactly the same performance characteristic as in FIG. 2 is achieved. With this system, since a pair of exactly the same gear trains are used, development cost can be reduced drastically and also a remarkable cost reduction effect resulting from mass-production can be attained.

Figure 18:
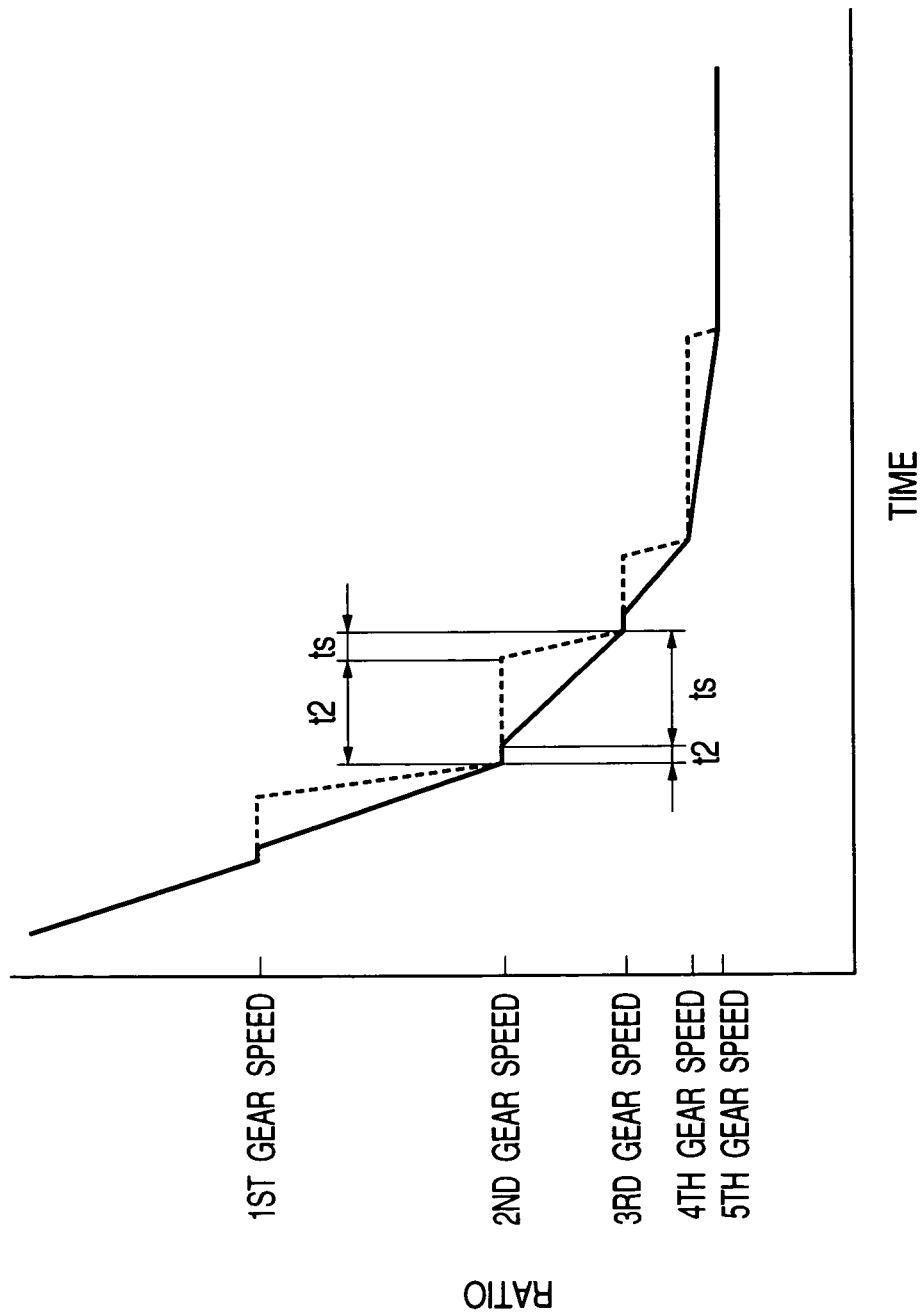
FIG. 18 is a characteristic diagram showing the change of ratio according to the fourth embodiment of the invention.

FIG. 18 is an explanatory figure showing the operation of the transmission according to the fourth embodiment of the present invention. A conventional automatic transmission is so controlled that the time needed for changing the gears be as short as possible. Because of this, in the case of driving at the 2nd gear speed and then at the 3rd gear speed, for example, the automobile drives at the 2nd speed for a length of time t2 and then shifts to the 3rd speed in a very short length of transmission time ts as shown by a dotted line. In this embodiment, however, as shown by a solid line, the driving time t2 at the 2nd gear speed is controlled to be shorter and transmission time ts longer.

Under this control, because the change of ratio becomes closer to a hyperbolic curve as a whole, excellent characteristic of traction force for easy drive can be attained and besides, because this control realizes continuously variable transmission, smooth transmission characteristic resulting in no transmission shock can be realized.

FIG. 19 is an explanatory figure showing the operation of the transmission according to the fifth embodiment of the present invention. This figure differs from FIG. 18 only in the characteristic of change of the ratio in the transmission time t2. For example, in the case of driving from the 2nd gear to the 3rd gear speed, after driving at the 2nd gear speed for a very short time t2, the automobile runs, using the 2.5-th gear 28 and controlling the ratio by the motor 5. In this operation, gradual gear change towards the 3rd gear ratio as shown in FIG. 17 is not employed but the ratio is changed instantly up to the 2.5-th ratio for driving and, when the automobile speed increases to conform to the 3rd gear speed, the ratio is changed instantly to be equivalent to the 3rd gear ratio and the 3rd gear 14 is connected.

Although, with this control, the automobile drives with a half-position gear for the most of its drive time and the change of ratio is similar to that of a conventional transmission as shown by a dotted line, advantages below are expected.

When the automobile drives with the most appropriate half-position gear, the motor rotating speed is zero and the transmission is neither in the powering nor in the regenerating condition although the motor transmits the engine torque, and so no current flows through the battery. If the transmission is controlled at a ratio greater than the half-position gear ratio, it comes into the regenerating condition and charges the battery.

If the transmission is controlled at a ratio smaller than the half-position gear ratio, it comes into the powering condition and discharges current from the battery. Because of this, battery control can be easier and driving under well-controlled battery condition becomes available. Besides, since the transmission is always at a half-position gear, gear change to either up-shift side or down-shift side can be achieved very quickly, resulting in extremely quick transmission response.

Reference signs in the drawings show the following parts.

1 Engine, 2 Transmission, 3 Output shaft, 4 Tire, 5 Motor, 6 Battery, 7 Motor control equipment, 8 Transmission control equipment, 9 Engine control equipment, 10 Electronic control throttle valve, 11, 25 Shaft, 12 1st gear, 13 2nd gear, 14 3rd gear, 15 4th gear, 16 5th gear, 17, 31 Reverse gear, 18, 19, 20, 32, 33, 34 Dog clutch, 21, 22, 23, 35, 36, 37 Shift actuators 26 0.5-th gear, 27 1.5-th gears 28 2.5-th gear, 29 3.5-th gear, 30 4.5-th gear, 38 Inverter control equipment, 39 High-speed switching device, 40 Current sensor, 41 Angle detection position sensor, 42, 43 Final gear connecting gears 44 Final gear, 45 Planetary gear, 46 Connecting gear of shaft 11, 47 Connecting gear of shaft 25, According to the present invention, by installing half-position transmission gears at every 0.5-th gear speed, capacity of the motor, which is very much expensive, can be reduced, and a remarkable economic effect can be attained.

Because jump shift under the power-on condition, which has not been possible with a conventional transmission, becomes available, drivability improves.

Because charging and discharging of the battery complete in a single cycle of transmission operation, battery capacity can be designed smaller and so an economic effect is attained.

Because no clutch is needed, unstable friction control can be eliminated and so the controllability and drivability improve remarkably. Besides, high economic effect can be attained.

If, use of a common output gear train is ceased and two separate output shafts are installed, this system can be realized using a pair of exactly the same transmission gear sets, and so development cost can be reduced drastically.

If the time needed for transmission is positively set longer and the system is controlled by the motor for the most of the drive time, continuous transmission ratio is achieved and so drivability can be improved. Besides, driving at a transmission ratio near a half-position gear ratio enables to control the charging and discharging of the battery and also to respond to shifting to the next position very quickly, resulting in improved response.

What is claimed is:

1. An automatic transmission system comprising:
   a first input shaft connected to an internal combustion engine;
   a first transmission gear train, gears of said first transmission gear train being each disconnectable, installed on said first input shaft;
   a second input shaft;
   a second transmission gear train, gears of said second transmission gear train being each disconnectable, installed on said second input shaft;

an output shaft connected commonly to each gear of said first transmission gear train and second transmission gear train;

a motor for generating torque, continuously connected to the first input shaft and the second input shaft via gears, whereby the torque is transferred between said first input shaft and second input shaft; and a control equipment to control the torque and rotational speed of said motor and connection/disconnection of said first and second transmission gear trains.

2. The automatic transmission system according to claim 1, wherein the gears for transferring the torque from the motor to the first and second input shafts are bevel gears.

3. The automatic transmission system according to claim 1, wherein the first input shaft is directly connected to the internal combustion engine.

4. An automatic transmission system according to claim 1, wherein a gear ratio of each of said second transmission gear train gears is set to a half-position of a gear ratio of a corresponding one of said first transmission gear train gears.

5. An automatic transmission system according to claim 1, wherein a second gear of said gears of said second transmission gear train is connected while the system being driven by a first gear of said gears of said first transmission gear train;

the transmitting torque of said first gear is decreased by increasing said second input shaft torque by the motor;

said first gear is disconnected when the transmitting torque of said first gear becomes nearly zero;

a rotational speed of said first input shaft is set closer to that of a second gear of said first transmission gear train, while maintaining the second input shaft torque by said motor; and when the rotational speed of the first input shaft has synchronized with that of the second gear of said first transmission gear train, the first input shaft is connected to its second gear, the generated torque of the motor is set to zero, and the second gear of said second transmission gear train is disconnected.

6. An automatic transmission system according to claim 1, wherein a second gear of said gears of said second transmission gear train is disconnected while being driven by a first gear of said gears of said first transmission gear train;

the transmitting torque of said first gear is decreased by increasing said second input shaft torque by said motor;

said first gear is disconnected when the transmitting torque of said first gear becomes nearly zero;

a rotational speed of said first input shaft is maintained near a the rotational speed of said second gear of said second transmission gear train to drive an automobile, while maintaining the second input shaft torque by said motor; and, the rotational speed of the first input shaft is set closer to that of a second gear of the first transmission gear train; and said second gear of said first transmission gear train gear is connected with said first input shaft when the rotational speed of the first input shaft has synchronized with that of said second gear of the first transmission gear train, and the generated torque of said motor is set to zero and said second gear of the second transmission gear train is disconnected.

7. An automatic transmission system according to claim 1, wherein a second gear of said gears of said second transmission gear train is connected, while being driven by a first gear of said gears of said first transmission gear train;

the transmitting torque of said first gear is decreased by increasing the second input shaft torque by said motor;

said first gear is disconnected when the transmitting torque of said first gear becomes nearly zero;

a rotational speed of the first input shaft according to an automobile speed to drive an automobile is continuously varied, while maintaining the second input shaft torque by said motor; and when the rotational speed of the first input shaft has synchronized with that of a second gear of the first transmission gear train, said second gear is connected with the first input shaft, the generated torque of said motor is set to zero, and said second gear of said second transmission gear train is disconnected.

8. An automobile equipped with an internal combustion engine, automatic transmission, and control equipment that controls the internal combustion engine and automatic transmission; wherein the automatic transmission comprises:

a first input shaft connected to the internal combustion engine;

a first transmission gear train, of which gears are each disconnectable, installed on the first input shaft;

a second input shaft;

a second transmission gear train, of which gears are each disconnectable, installed on the second input shaft;

an output shaft connected commonly to each gear of the first transmission gear tram and second transmission gear train; and a motor for generating torque, continuously connected to the first input shaft and the second input shaft via gears, whereby the torque is transferred between the first input shaft and second input shaft; and said control equipment connects a second gear of the second transmission gear train gears to the second input shaft, while the automobile is being driven by a first gear of the first transmission gear train;

decreases the transmitting torque of the first gear by increasing the second input shaft torque by the motor;

disconnects the first gear when the transmitting torque of the first gear becomes nearly zero;

sets a rotational speed of the first input shaft closer to that of a second gear of the first transmission gear train, while maintaining the second input shaft torque by the motor; and when the rotational speed of the first input shaft has synchronized with that of the second gear of the first transmission gear train, connects the second gear of the first transmission gear train with the first input shaft, sets the generated torque of the motor to zero, and disconnects the second transmission gear of the second transmission gear train.

9. The automobile according to claim 8, wherein the gears for transferring the torque from the motor to the first and second input shafts are bevel gears.

10. The automobile according to claim 8, wherein the first input shaft is directly connected to the internal combustion engine.

11. An automatic transmission system comprising:
a first input shaft connected to an internal combustion engine;
a first transmission gear train, gears of said first transmission gear train being each disconnectable, installed on the first input shaft;
a second input shaft;
a second transmission gear train, gears of said second transmission gear train being each disconnectable, installed on said second input shaft;
an output shaft connected commonly to each gear train of said first transmission gear train and second transmission gear train;
a motor for generating torque, continuously connected to the first input shaft and the second input shaft via gears, whereby the torque is transferred between said first input shaft and second input shaft;
of which system connects a second gear of the second transmission gear train, while the system being driven by a first gear of the first transmission gear train;
decreases the transmitting torque of the first gear by increasing the second input shaft torque by the motor;
disconnects the first gear when the transmitting torque of the first gear becomes nearly zero;
sets the rotational speed of the first input shaft closer to that of a second gear of the first transmission gear train, while maintaining the second input shaft torque by the motor, and
when the rotational speed of the first input shaft has synchronized with that of the second gear of the first transmission gear train, connects the second gear of the first transmission gear train with the first input shaft, sets the generated torque of the motor to zeros and disconnects the second transmission gear.

12. The automatic transmission system according to claim 11, wherein the gears for transferring the torque from the motor to the first and second input shafts are bevel gears.

13. The automatic transmission system according to claim 11, wherein the first input shaft is directly connected to the internal combustion engine.

* * * * *